United States Patent [19]
Xu et al.

[11] Patent Number: 5,784,485
[45] Date of Patent: Jul. 21, 1998

[54] METHOD AND APPARATUS FOR AUTOMATED PATTERN RECOGNITION

[76] Inventors: Youguang Xu, 3164 W. Springs Dr., Apt. A. Ellicott City, Md. 21043; Chein-I Chang, 3685 Cragsmoor Rd., Ellicott City, Md. 21042

[21] Appl. No.: 296,039

[22] Filed: Aug. 25, 1994

[51] Int. Cl.$^6$ ........................................... G06K 9/62
[52] U.S. Cl. ..................... 382/156; 382/161; 382/220
[58] Field of Search ........................... 382/155, 156, 382/159, 160, 161, 209, 220, 224, 225; 395/22, 23

[56] References Cited

U.S. PATENT DOCUMENTS

| | | | |
|---|---|---|---|
| 4,153,897 | 5/1979 | Yasuda et al. | 340/146.3 Q |
| 4,805,225 | 2/1989 | Clark | 382/161 |
| 4,817,171 | 3/1989 | Stentiford | 382/19 |
| 5,058,184 | 10/1991 | Fukushima | 382/158 |
| 5,065,440 | 11/1991 | Yoshida et al. | 382/30 |
| 5,422,981 | 6/1995 | Niki | 395/22 |

OTHER PUBLICATIONS

Fukushima, et al.; "Neocognition: A Neural Network Model for a Mechanism os Visual Pattern Recognition", 13 IEEE Transactions on Man, Systems and Cybernetics 826–834 (Sep./Oct. 1983).

Memon & Heinemann ('Classification of Patterns using a self–organizing neural network'), Neural Networks, vol. 1, 1988, pp. 201–215.

Barnard & Casasent ('Shift invariance and the Neocognitron'), Neural Networks, vol. 3, 1990, pp. 403–410.

Primary Examiner—Leo Boudreau
Assistant Examiner—Phuoc Tran

[57] ABSTRACT

The present invention relates to a new and useful Automated Pattern Recognition Device comprising a neural-network system, implemented on a general purpose computer, and capable of recognizing not only printed characters but also handwritten characters and other patterns in n-dimensions. The system incorporates novel feature extraction which generates an additional dimension from an n-dimensional input pattern, for example, a three-dimensional feature pattern from a two dimensional input pattern, resulting in shift-invariance, scale-invariance, and invariance to slight rotation.

13 Claims, 9 Drawing Sheets

○ The position of the first end of a character
□ The position of the first highest peak

METHOD AND APPARATUS FOR AUTOMATED PATTERN RECOGNITION

FIELD AND BACKGROUND OF THE INVENTION

The present invention relates in general to automated pattern recognition and in particular to a new and useful Automated Pattern Recognition Device comprising a neural-network system, implemented on a general purpose computer, and capable of recognizing not only printed characters but also handwritten characters and other patterns in n-dimensions. The system incorporates novel feature extraction which generates an additional dimension from an n-dimensional for example, a three-dimensional pattern feature pattern (from a two dimensional pattern input), resulting in shift-invariance, scale-invariance, and invariance to slight rotation.

The objective of pattern recognition is to classify target patterns as defined "characters". Such systems are useful in adapting paper-based information, such as postal envelopes, bank checks, credit card imprints, and other records, to a form in which they can be processed by computers, and in identifying n-dimensional objects such as sorting bottles.

Pattern recognition is illustrated in its general form in FIG. 1. Overall Pattern (1) is separated from Background (2), and divided into multiple Target Patterns (3), then each target pattern (3) is identified as a Character (4).

One example of two-dimensional automatic pattern recognition is Optical Character Recognition (OCR). A typical OCR procedure, recognizing a postal address, would comprise the following steps:

1. position the overall pattern to be recognized (here, an address on an envelope)

2. acquire the overall pattern data (here, with an optical scanner)

3. quantize the data (e.g., convert analog optical signals to digital signals)

4. isolate the target patterns within the overall pattern 5. thin and normalize the target patterns 6. segment and perform feature extraction (i.e., identify the major structure of the strokes which make up the target patterns)

7. recognize the characters

The recognition process may be followed by further processing (for example, spell-checking) to verify the result.

All of the above steps and means for performing them are known in the art. The present invention provides an improved means for performing recognition.

One current method of recognition uses template matching techniques, comparing the two-dimensional image of an input pattern to a set of prototype images. The prototype image that best matches the input pattern image is used to identify the character. This method suffers from sensitivity to noise and is not adaptive to different writing styles.

Another current method of recognition uses feature matching techniques, extracting significant features from an input pattern, and comparing them to pre-defined feature descriptions of characters. The character with features best matching the features of the input pattern is used to identify the input pattern.

Examples are described in U.S. Pat. No. 4,805,225 ("Pattern Recognition Apparatus") issued Feb. 14, 1989 to Clark and U.S. Pat. No. 5,058,184 ("Hierarchial Information Processing System") issued Oct. 15, 1981 to Fukushima, both of which are incorporated herein by reference, and in Fukushima et al. "Neocognitron: A Neural Network Model for a Mechanism of Visual Pattern Recognition", 13 IEEE Transactions on Man, Systems and Cybernetics 826–834 (September/October 1983).

The Neocognitron is one of a class of neural network processes for OCR known as "perceptrons".

As shown schematically in FIG. 2, Neocognitron comprises an input layer (10), U0, typically consisting of a photoreceptor array, and a number of modular structures (11 through 14) each made up of two layers of cell planes in which one layer (15 through 18), $Us_i$, consists of S (Simple) cells and the other layer (19 through 22), $Uc_i$, consists of C (Complex) cells. The layers in first module (11) are denoted by Usl (15) and Ucl (19) respectively. An S cell corresponds to a simple cell or a higher level hypercomplex cell.

Each C cell has afferent synapses generated from a group of S cells. The presynaptic S cells extract similar stimulus features with slightly different positions on the preceding layer. The C cell will be activated whenever at least one of its presynaptic S cells is activated. As a result, the C cell is less sensitive to shifts in position of the stimulus feature than its presynaptic S cells.

The process of pattern recognition using this multilayered network can be illustrated briefly as follows. A stimulus pattern or input layer (10) is observed within a range by S cells (15) in a first module (11) so that several separate features of the stimulus pattern can be extracted. In a second module (12), these features are combined by observation over a slightly larger range so that higher level features can be combined and extracted. The observation process is repeatedly applied to following modules (13, 14). In each stage of feature extraction, a small amount of position error is allowed. Apparently, the more stages are processed, the more distortion can be tolerated. Eventually, the network can theoretically recognize highly distorted and deformed patterns.

The layer Usl (15) has 12 cell planes, each of which has the same size as does U0 (10), i.e., 19×19 cells. The 12 Usl planes correspond to cells excited by 12 specific orientations in the stimulus pattern. A 3×3 masking window is used for the purpose of extracting 12 specific azimuths to produce 12 cell plane patterns of Usl. The angle difference between two consecutive mask patterns is 22.5°.

Neocognitron is trained on a series of pattern sets. Layer-by-layer, English alphanumeric characters may be mapped into 35 cells (ten numerals plus 26 letters, but with the numeral "zero" and the letter "O" being treated as indistinguishable except by context), each covering a series of the same alphanumeric characters in different handwriting styles, but having the same features. While easy to describe, this is difficult to implement. Neocognitron requires 4 S-C pair layers to recognize 35 alphanumeric characters.

Neocognitron is also highly dependent on training pattern sets. If significant features are not included in the training set, Neocognitron will not recognize certain characters. Thus, Neocognitron must be provided with training patterns which can represent all possible handwritten characters. Neocognitron, and other systems which rely on training pattern sets, impractical because a character can be written in so many different styles and sizes that it would require thousands or millions of training patterns. Due to the wide variety of handwriting styles, it is almost impossible (and, with current technology, impractical) to include a complete training pattern set. The more characters to be recognized, the more difficult the selection of training patterns. If the size of Neocognitron's input layer (10) needs to be expanded, all of the training pattern sets must be redesigned and the system must be retrained.

In character recognition systems, two properties are very desirable: shift invariance and scale invariance. Ideally, recognition of a character must not depend on the character's position or size.

Menon & Heinenmann ('Classification of Patterns using a self-organizing neural network' *Neural Networks*, vol. 1, 1988, pp. 201–215) have shown (a) that Neocognitron does not automatically perform shift-invariant pattern recognition, and (b) that Neocognitron requires 15 S-C pair layers for a 128×128 input layer U0 to achieve shift invariance. The complexity grows drastically if the number of layers is increased and some information from layer Sn to layer Cn may be lost as reported in Barnard & Casasent ('Shift invariance and the Neocognitron,' *Neural Networks*, Vol. 3, 1990, pp. 403–410).

The instant invention is shift-invariant and scale-invariant. It is also more effective, efficient and is easier and cheaper to implement than Neocognitron.

It is therefore an object of the present invention to provide a new and useful method and apparatus for pattern recognition.

It is another object of the invention to identify printed and handwritten characters and n-dimensional patterns efficiently and accurately, in a manner which is easy and inexpensive to implement on a personal computer.

It is another object of the invention to perform shift-invariant patten recognition automatically.

It is another object of the invention to perform scale-invariant pattern recognition automatically.

It is another object of the invention to provide an optical character recognition apparatus which is more effective, efficient and easier and cheaper to use than those currently needed.

These and other objects which will be apparent from the discussion which follows are achieved, in accordance with the invention, by providing an neural-network system for automatic pattern recognition, implemented on a general purpose computer, using a novel method of feature extraction which generates an (n+1) dimensional vector from an n-dimensional target pattern by sequentially applying masks to the target pattern and producing a measure of the target pattern's "altitude", or degree of fit with those masks.

The various features of novelty which characterize the invention are pointed out with particularity in the claims annexed to and forming a part of this disclosure. For a better understanding of the invention, its advantages and objects, reference is made to the accompanying drawings and descriptive matter in which a preferred embodiment of the invention is illustrated.

BRIEF DESCRIPTION OF THE DRAWINGS

The foregoing and still other objects of this invention will become apparent, along with various advantages and features of novelty residing therein, from study of the following drawings, in which.

DESCRIPTION OF THE PREFERRED EMBODIMENT

Figure 1:
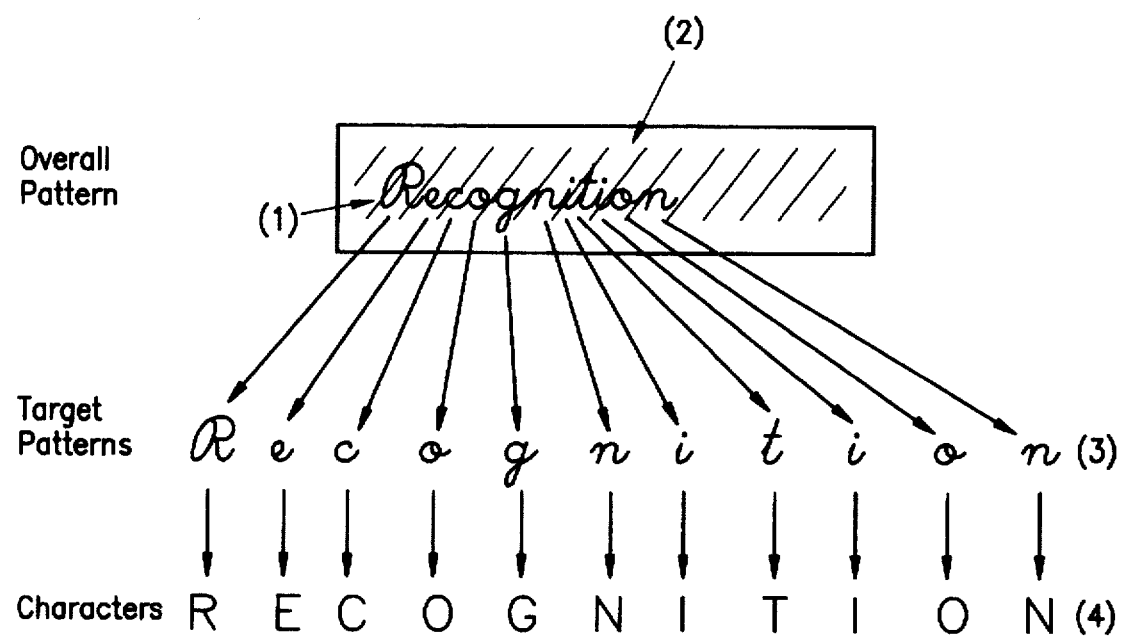
FIG. 1 Is a schematic illustration of data acquisition steps.
Figure 2:
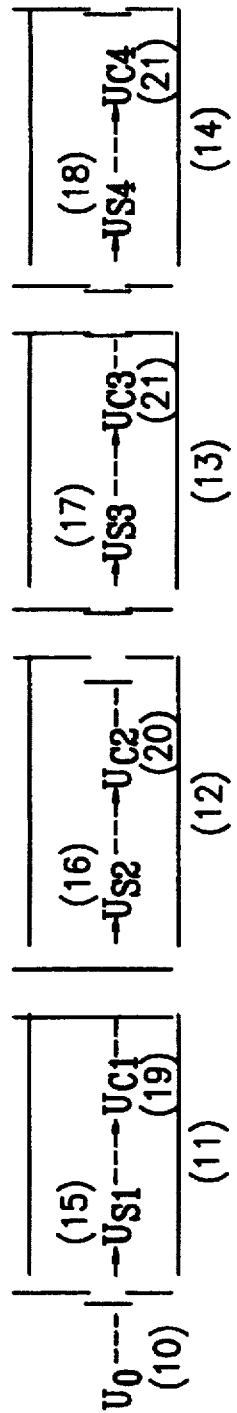
FIG. 2 Is a schematic diagram of the structure of a Neocognitron neural network.

Referring to the drawings, the invention is an Automatic Pattern Recognition Device ("APRD") comprising a neural-network system which permits effective automated pattern recognition to be implemented on a general purpose computer, capable of recognizing printed and handwritten characters and n-dimensional patterns. The APRD extends the prior art system for recognizing 2-D characters to 3 dimensions (3-D) and can similarly be applied to recognize 1-dimensional signals (e.g., signal traces), 3-dimensional patterns (e.g., solid objects) and more generally, n-dimensional patterns.

Although applicable to any pattern set (pattern being used in a broad sense which would include, for example, fingerprints, logos, biological cell shapes and general n-dimensional objects), the invention may be illustrated with reference to hand written characters such as English numerals and letters.

It should first be noted that the obvious approach to reducing the complexity of the 2-D neocognitron would to project a 2-D character pattern onto a one-dimensional (1-D) array. However, this distorts the shapes of characters and does not offer a satisfactory solution.

Figure 3:
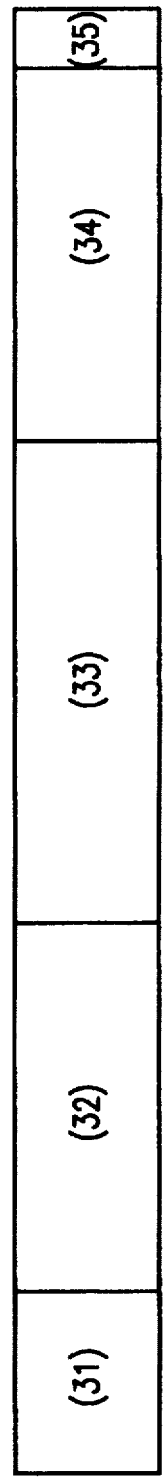
FIG. 3 Is a schematic drawing of a feature vector.

Counterintuitively, the APRD adds another dimension, extending a 2-D character pattern to a 3-D model determined by a feature vector that extracts ends and sharp angles and altitudes of the character from the third dimension of the model. Referring to FIG. 3, for each 2-D character, 5 components constitute its feature vector. The first component (31) is a 1-unit array which names the character associated with the feature vector. The second (32) is an array where each unit represents one end or sharp angle of the character based on 8 different end directions described below. Since there are at most 5 possible ends or sharp angles of the 35 English handwritten characters, only 5 units are required for this example. For instance, both "M" and "W" require 5 units to identify their ends and sharp angles. The third (33) is a 15-Unit array to list up to 15 local maxima of altitude where a local maximum is identified if it is in the center of a 5×5 window with the highest altitude. The fourth (34) is a 25-unit array to show the altitudes of 25 cells in a 5×5 area with the center cell having the highest altitude of the character. Finally, the fifth component (35) contains auxiliary units that will be used for further recognition if previous components have failed to recognize the character. Four such units are sufficient for English alphanumeric characters. Thus a feature vector for English may be specified by a 50-component array.

The collection of feature vectors constitutes a feature library. According to our experiments, most recognition can be accomplished with the first four components; need for the fifth component is rare. When implemented on a 386 PC the recognition process takes only a few seconds.

Each character is represented by its own reference feature vector based on the above rules. If two characters match the same feature vector, they will be treated as the same character.

The operation of the APRD will now be explained in detail. A summary flow chart is presented in FIG. 4. The acquisition of training or recognition patterns in digital form is accomplished using techniques known in the art.

A feature library (41) comprising a plurality of reference vectors is stored, either by direct input of an existing feature library or by neural network training or by character-by-character input. The feature library stores feature vectors which have been produced previously.

The recognition procedure of APRD begins with a target pattern being acquired, isolated and input into layer U0 as a digital image (42), here a 2-D 19×19 cell array, binary-encoded so that "1" is assigned to cells containing strokes of the pattern and "0" to blank cells. As a result, the character is represented by a 2-D bitmap. It should be noted that the 2-D bitmap is a static image; no information about the strokes' order is available.

After converting a character to a 2-D bitmap, a feature vector is generated for the target pattern (43), comprising a characteristic vector for said target pattern. The $S_1$ Layer is generated (50) by applying two pattern matching sequences.

Figure 5:
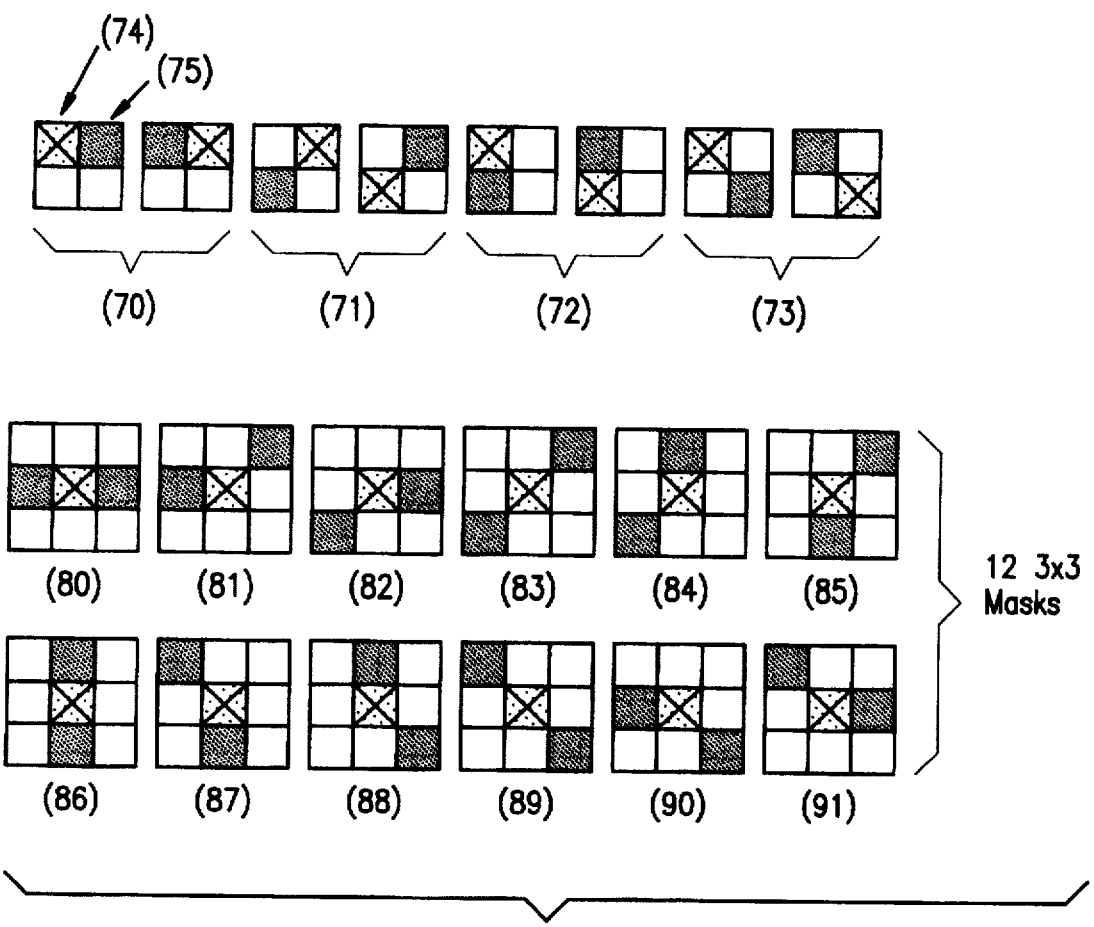
FIG. 5 Illustrates S-cell matrix masks used in feature extraction.

First sequence (60) generates weight assignments by processing a series of 8 2×2 masks as follows. As shown in FIG. 5, 8 masks are classified into 4 consecutive patterns (70 through 73). The difference between two consecutive patterns is 45°. More precisely, pattern (70) represents 0° and 180°, pattern (71) represents 45° and 225°, pattern (72) represents 90° and 270°, and pattern (73) represents 135° and 315°. A cell with X (such as 74) is called a seed cell and a shaded cell (such as 75) is called its neighboring cell. When a 2×2 mask is scanned across the 19×19 cell array of input layer $U_0$ (42), a seed cell will be assigned weight 1 if there is a match. That is, if a pattern contains a cell which corresponds to one of patterns 70, 71, 72 or 73, the cell will be weighted by 1. Thus, eight cell planes are generated.

Referring back to FIG. 4, second sequence (61) generates weight assignments by processing a series of 12 3×3 masks as follows.

Referring to FIG. 5, 12 masks are represented by 12 consecutive patterns (80–91). The difference between two consecutive patterns is 22.5°. For instance, pattern 80 represents 0° and 180°, pattern 81 represents 22.5°, pattern 82 represents 202.5°, pattern 83 represents 45° and 225°, pattern 84 represents 235.5°, pattern 85 represents 67.5°, pattern 86 represents 90° and 270°, pattern 87 represents 112.5°, pattern 88 represents 292.5°, pattern 89 represents 135° and 315°, pattern 90 represents 337.5°, and pattern 91 represents 157.5°. It should be noted that pattern 80 (3×3 mask) corresponds to pattern (70) of the 2×2 masks. When a 3×3 mask is scanned across the input cell array (42), a seed cell will be assigned weight 2 if there is a match. That is, if a pattern contains a cell which corresponds to one of patterns 80–91, the cell will be weighted "2". Thus, 12 cell planes are generated.

After both masking sequences have been completed, Layer $S_1$ (50) is created by copying the 8 cell planes into their adjacent cell planes, using a "large weight-dominates-small weight." Copy rule ("LWDSW"). Eight orientations (azimuths), represented by 8 2×2 masks, result, which can be used to identify ends of strokes of characters.

Next the $C_1$ layer (51), which comprises 8 21×21 cell planes, is generated using the following procedure:

1. Cell planes 0, 2, 4 and 6 of layer $C_1$ are obtained by copying cell planes 0, 3, 6 and 9 of layer $S_1$ respectively.

2. Cell plane 1 of layer $C_1$ is generated by merging cell planes 1 and 2 of layer $S_1$. Similarly, cell planes 3, 5, and 7 are obtained by merging cell planes 4 and 5, 7 and 8, and 10 and 11 of layer $S_1$ respectively. During the merging process, the LWDSW rule is followed.

After merging, each of the 8 cell planes of 19×19 cell size are mapped to 21×21 cell size plane by expanding each original cell into a 3×3 block of cells with the original cell as the center of the block. Then the weight of the center cell is copied into the weights of cells in this expanded block. The copy rule is again LWDSW. The resulting 8 cell planes make up the $C_1$ layer.

A new layer, called the "Intermediate Layer" (52), being intermediate between the $C_1$ and $S_2$ layers and denoted by ICS is next introduced. The ICS layer is a novel feature which is not found in Neocognitron.

For each cell plane in the $C_1$ layer, each cell is assigned a value as follows: 0 (no match) or 1 (matching a 2×2 mask) or 2 (matching a 3×3 mask). The ICS comprises a cell plane of size 21×21 wherein the contents of each cell of the ICS (52) is obtained by summing all weights of the corresponding cell in the 8 cell planes in layer $C_1$ (51). Since each cell plane of layer $C_1$ can have a weight no greater than 2, the weight of each cell in the Intermediate Layer (52) will have a weight of at most 16. Using hexadecimal notation, the contents of each cell in layer ICS can be stored in only 4 bits. The weight associated with a given cell can be viewed as the altitude of the cell. As a result, a 2-D input pattern can be represented as a 3-D figure with the first two dimensions corresponding to the (x,y) coordinates of the location, and the third dimension characterized by weight.

Since the weight is calculated based on matches between the cell patterns and masking patterns, the higher the weight assigned to the cell, the more patterns the cell matches. Therefore, the altitude generated in 3-D measures the significance of the cells.

Several very important features of a character such as ends, corners, joints and conjunctions which make up significant parts of the character should not depend upon writing styles. Using this critical information without depending upon the position and the scale of the handwritten character to be recognized is crucial in recognition. While difficult to do using a 2-D approach, this problem is easily solved by this invention by storing this information in the third (altitude) dimension which is independent of (x,y) coordinates. As a result, translation-invariance, scale-invariance and slight rotation invariance can be achieved by using the information in the third dimension. It should be noted that complete rotation invariance is not possible for handwritten characters, since some characters are distinguished solely by their degree of rotation (for example, "9" and "6").

By copying weight 1 of cells in cell planes generated by 2×2 mask windows into its adjacent cell planes in $C_1$ and expanding the seed cell to its 8 neighboring cells, the weight of ends of strokes will appear as a sequence of 3's. More specifically, the weight of all ends of strokes will be characterized by one of the following patterns:

| (A) | 3 3 3 | (B) | x x 3 | (C) | x x x | (D) | 3 x x |
|-----|-------|-----|-------|-----|-------|-----|-------|
|     | x x x,|     | x x 3,|     | x x x,|     | 3 x x,|
|     | x x x |     | x x 3 |     | 3 3 3 |     | 3 x x |

This information can be used to identify the pattern, as follows. If the pattern contains a horizontal row of three 3's (patterns A or C above), we will use the center 3 as the seed cell to check if the weight of its above or below cell is 0. If its above cell has weight 0, this indicates that the orientation of the end of stroke must be 7, otherwise, the orientation must be 3. Similarly, if the pattern contains a vertical row of three 3's, the center 3 will be chosen for the seed cell to check if the weight of its left or right cell is 0. If its left cell has weight 0, this indicates that the orientation of the end of stroke must be "1", otherwise, the orientation must be 5.

| If the pattern is | 3 x x |
|---|---|
|  | 3 x x |
|  | 3 3 3 |
| we are certain that the orientation at the end is "2". | |
| If the pattern is | x x 3 |
|  | x x 3 |
|  | 3 3 3 |
| we are certain that the orientation of the end must be "4". | |
| If the pattern is | 3 3 3 |
|  | x x 3 |
|  | x x 3 |
| we are certain that the orientation of the end must be "6". | |
| If the pattern is | 3 3 3 |
|  | 3 x x |
|  | 3 x x |
| we are certain that the orientation of the end must be "8". | |

In some cases, the stroke and direction does not provide sufficient information for recognition or identification. Another valuable data point is the altitude assigned to each cell of a character. A cell will have a higher altitude if it covers more patterns in layer $C_1$. Peaks of altitude provide information on the complexity of the stroke. For example, if the stroke is a straight segment, the altitudes of the cells making up this stroke are low since these cells will cover one azimuth. On the other hand, if a stroke has an angle, the cells of the stroke should have higher altitudes because they cover more azimuths. Based on this observation, we define a local peak maximum for a cell, say located in row j and column i (j,i), whose altitude must be greater than or equal to that of its adjacent cells (j−1, i−1), (j−1, i), (j−1, i+1), (j, i−1), (j, i+1), (j+1, i−1), (j+1, i) and (j+1, i+1). If there are more than one cell with equal local peaks, we must establish a convention for breaking the tie. Here, we choose the one in the right-bottom corner, as a matter of convention.

From the analysis of end directions and altitudes of strokes, we can construct layer $S_2$ (53) (not to be confused with the $S_2$ layer in Neocognitron, which has a different function). Unlike Neocognitron, which requires 80 cell planes in layer $S_2$, that are completely determined by a particular set of training patterns, APRD requires only two cell planes in layer $S_2$, which are independent of training patterns: one stores information on end directions and another stores information on local altitude peaks.

A feature vector is formed in the $C_2$ layer (43), by incorporating the information obtained in the $S_2$ layer (53).

Recognition can now be performed based on the feature vector, either by an unsupervised method (a direct recognition process from feature vectors) or by a supervised method (a recognition process using a Feature Library).

A direct recognition process (DRP) is a procedure which can identify a target pattern directly from its feature vector.

The procedure begins by categorizing the target character into six groups based on the number of its ends as follows:

| No. of Ends of the pattern | Possible candidates for the character |
|---|---|
| 0 | 0, 8, B, D |
| 1 | 6, 9, P and D, Q |
| 2 | 1, 2, 3, 4, 5, 7, 9, A, B, C, G, I, J, L, M, N, Q, R, S, U, V, W, Z |
| 3 | 3, E, F, J, T, Y and 1, 2, 4, 7, 9, G, L, M, W, Z, H, I, K, X |
| 4 | H, I, K, X and 4, 7 |
| 5 | M, W |

Figure 6:
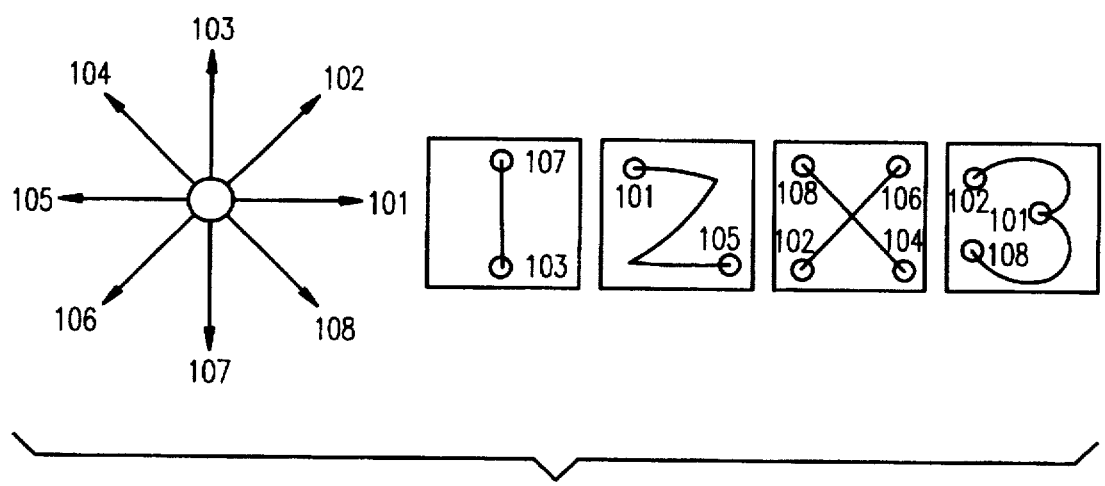
FIG. 6 Illustrates the definition of "end strokes" of characters.

Next, Section 2 (32) (end directions) is used to obtain information about how the character was written. For example, the end direction of character "6" may be an azimuth denoted by (103), (104), (105), (106), (107), in FIG. 6. Similarly, for characters "9", its end direction could be one of azimuths (103), (102), (1 of 1), (108), (107) and character "P" has only two possibilities ((103) and (102)) to be its end direction. If the end direction is (106), we are sure that it must be character "6". However, if the end direction is (103), it could be any of characters "6", "9" and "P".

If further information is necessary to identify the test character; we use Section 3 (33) of the feature vector (peaks).

Figure 7:
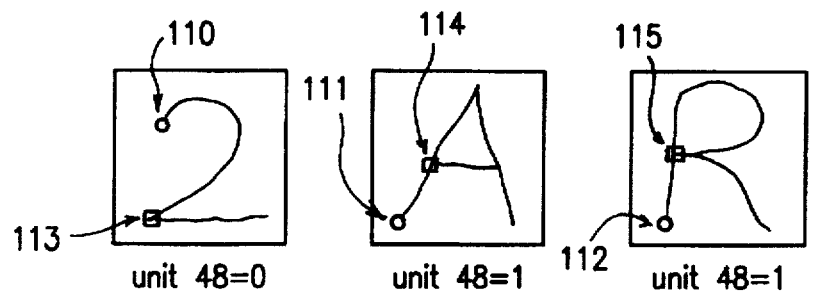
FIGS. 7 Illustrates identification of similar patterns using APRD's endpoint feature vector unit.

If the character still is not recognized, Section 4 (34) (altitudes surrounding the highest peak). In some cases, it is difficult to discriminate certain characters such as 2, Q, A, R, C, S. Then Section 5 of the feature vector (35) (auxiliary section), is used to identify specific characteristics which distinguish among similar patterns. While these characteristics depend on which particular patterns to be distinguished, several examples are illustrated in FIG. 7. Using the altitude (third dimension) generated by APRD, the similar characters "2", "A", and "R" may be distinguished by measuring characteristics of endpoints (110, 111, 112) with respect to the pattern's highest peak in 3-D (113, 114, 115). Character-specific information of this type may be stored in the feature vector.

DRP may fail, either because it can make no identification, or because it cannot choose between multiple possible identifications. In this case, a Supervised Method (SM), using the Feature Library is used. First, the Feature Library is checked to see whether the feature vector generated by the input pattern is already in the Feature Library (46). If it is, then the alphanumeric character corresponding to this feature vector will be identified (45). If not, the pattern is unknown and an identifier must be assigned to the input pattern and stored in unit 0 of the feature vector generated by the input pattern. The Feature Library (46) is then updated by storing this new feature vector in the Feature Library. Thereafter, when APRD encounters this feature vector, it will identify the test character as specified by unit 0 of its feature vector. The Feature Library can be stored as a data file on a PC disk drive or other storage medium.

While APRD can achieve a degree of rotation invariance, it can do so only to a slight degree. This is an inherent limitation of character recognition, due to the similarity of certain characters which are distinguished principally by their rotation. For instance, an "L" rotated by more than 22.5°, may look like a rotated "V"; a "6" and a "9" present a similar problem. In such cases, unless further information is provided, it is difficult to identify the character regardless of the method used. This is an inherent problem, due to the similarity of certain characters which are distinguished by their orientation.

Figure 8:
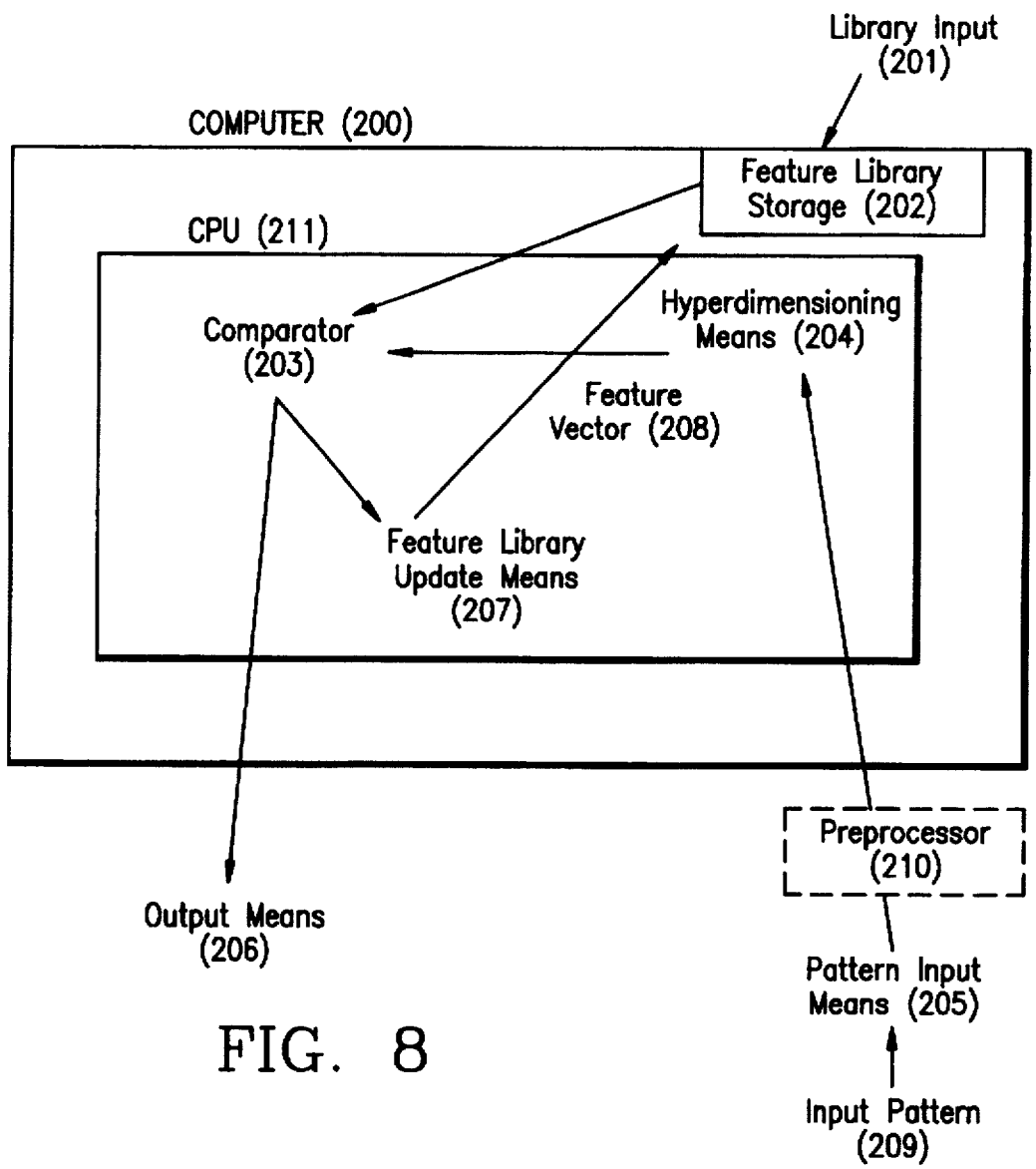
FIG. 8 Is a schematic diagram of a device for APRD using a general purpose computer.

The method described above can be implemented on a general purpose personal computer having a programmable central processing unit (CPU). As shown schematically in FIG. 8, the computer (200) must provide feature library input means (201) for acquiring a feature library, which would preferably be either a disk drive for reading a disk on which the feature library had previously been recorded, a digitizer such as an optical character reader, a digitizing tablet, a mouse, a joystick or a light pen or a keyboard, but most preferably a disk drive, said feature library characterized by having vectors of one dimension greater than that of the input pattern (such as would be created by using hyperdimensioning means as described below). Said feature library input means must communicate with Feature Library storage means (202) for storing said feature library, preferably a floppy disk drive, a hard drive, a floptical drive, a CD-ROM, a PROM chip or a RAM drive, and (from a speed and flexibility perspective) most preferably a RAM drive. A suitable equivalent for said feature library input means and storage means would be a special-purpose chip on which the feature library was stored, suitable for insertion into a socket in the computer; such an equivalent would sacrifice a degree of flexibility in updating the feature library. Said Feature Library storage means (202) must communicate with a comparator means (203), which may be implemented by software in the computer's CPU (211). Said comparator means (203) must communicate with hyperdimensioning means (211) for generating an (n+1)st dimension from an n-dimensional input as described below. Said hyperdimensioning means ((211) must communicate with pattern input means (205), which may (but need not) employ the same device as used for feature library input means (201); the types of equipment suitable for pattern input means include those suitable for feature library input means. Said comparator means (203) comprises means, preferably CPU (211), for comparing the input pattern feature vector generated as described below with each of several feature library feature vectors until a match is found or until all of the library feature vectors have been tested against the input pattern feature vector without a match. Said comparator means (203) also must communicate with output means (206), such as a computer monitor, a printer, a plotter or an annunciator, but preferably a printer or a computer monitor, to display the result of the comparison (either the identification of the input pattern or notification that the result was "no match"), and also with feature library update means (207) suitable for updating the particular storage medium chosen for the feature library (202) so as to add a new feature vector to the feature library in the case where no identification can be made from the existing feature library.

Figure 4:
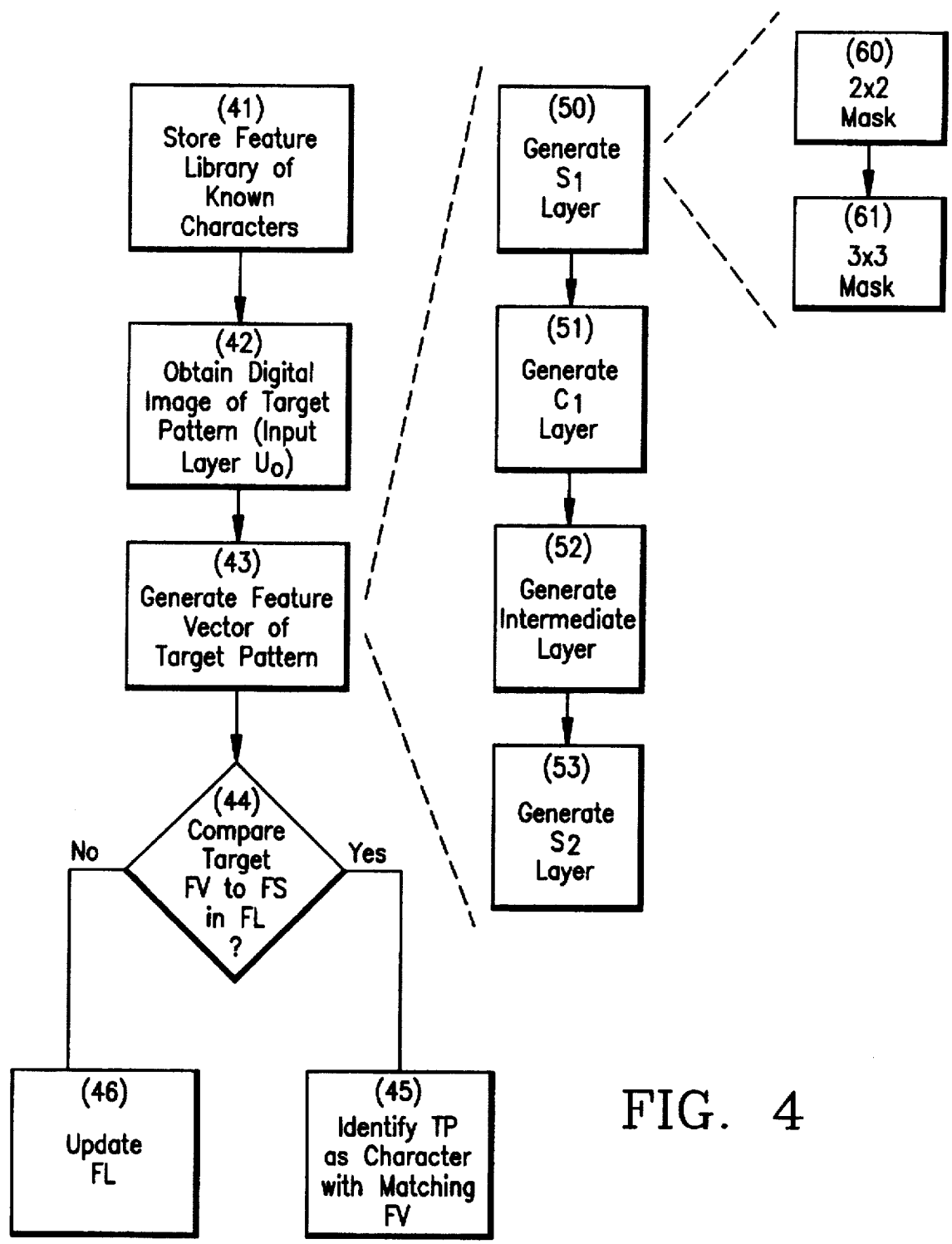
FIG. 4 Is a flow chart of process of recognition by APRD.

The hyperdimensioning means (211) generates a feature vector (208) from the input pattern (209) as follows. The input pattern is first digitized to form a bitmap. Successive masks of suitable varying size are compared to the input pattern bitmap, and the results of the comparisons used as inputs to a neural network so as to form an intermediate layer (52) of 1 dimension and an $S_2$ layer (53) of (n+1) dimensions as shown in FIG. 4 and previously described.

Optionally, preprocessing means (210) may be interposed anywhere between said comparator means (203) and said pattern input means (209) for such purposes as thinning or otherwise preparing the input pattern for the particular type of comparison to be performed.

Experimentally, a general purpose computer was configured and programmed using software set forth in Appendix A and incorporated herein by reference. Said software is provided to demonstrate that the apparatus can be produced using a general purpose computer and is not meant to limit the scope of the invention. Results of the experiment follow.

EXPERIMENTAL RESULTS

A simulation program to run APRD has been implemented on a 386/33 IBM™ PC compatible computer with 4 Mb RAM, running a program written in Turbo C++ using both the unsupervised method (DRP) and supervised method (using a Feature Library). This complete source code including graphic functions requires about 70 KB storage. A source code listing is attached as Appendix A; and is incorporated herein by reference. Running from a hard disk, the system took about 15 seconds including graphic display time to recognize one character; running from RAM, the time was less than 10 seconds including graphic display time. If only test results are required, the time is less than 8 seconds.

Figure 9:
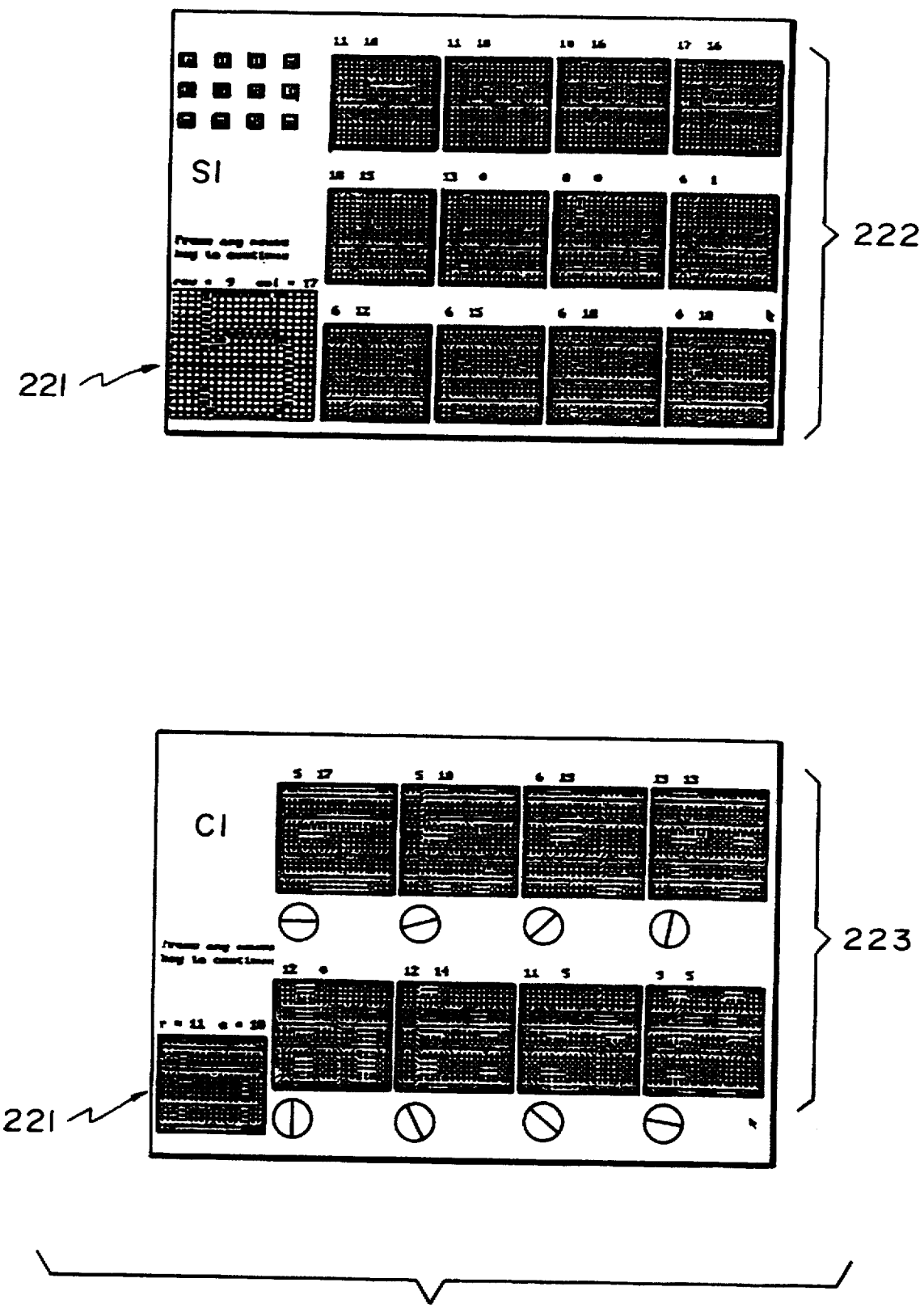
FIGS. 9–11 Displays experimental results of a pattern recognition experiment using a general purpose computer embodiment of the invention.
Figure 10:
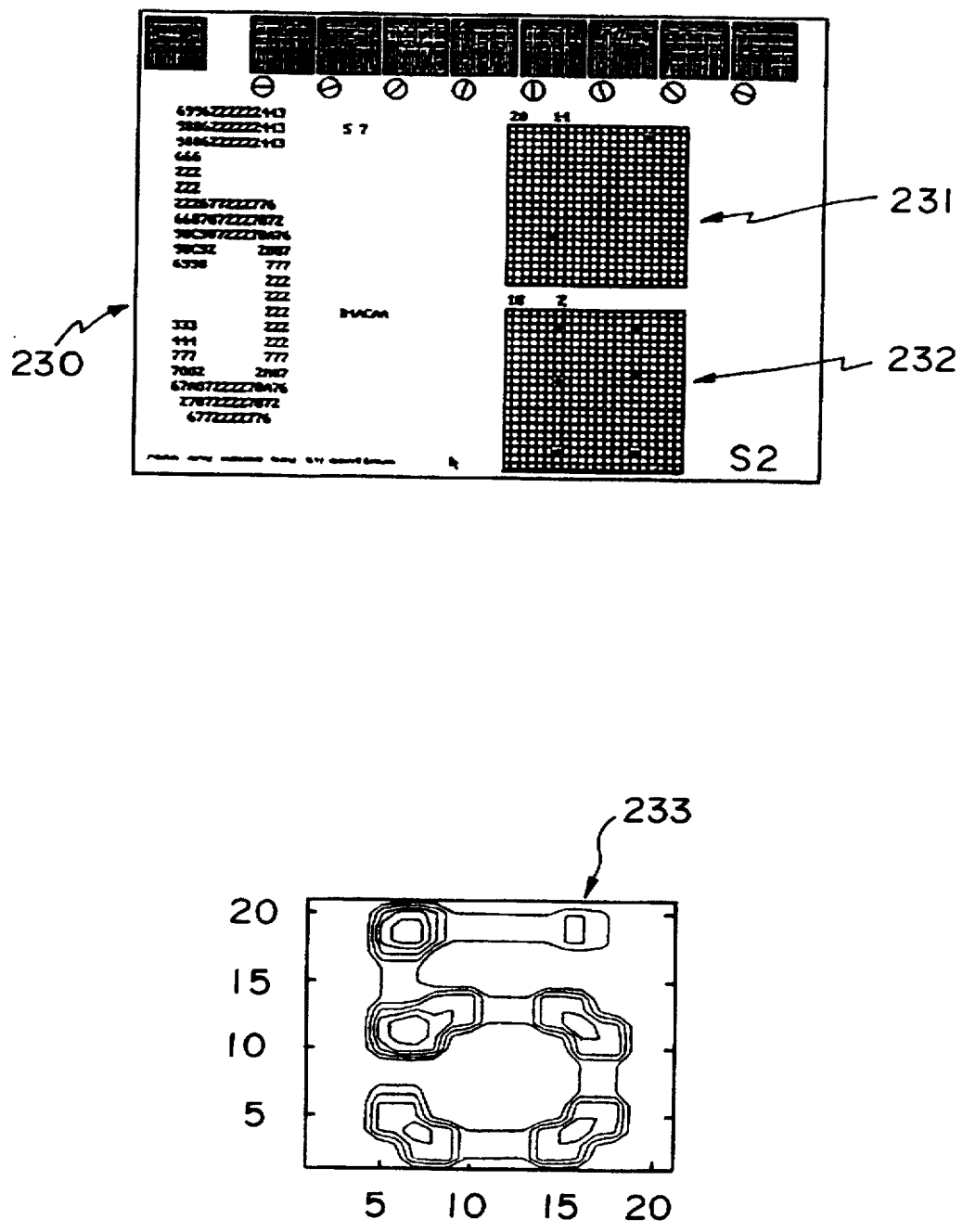

As an example, recognition of the numeral "5" is demonstrated. Section 1 is blank before a recognition procedure starts and will be used to store the number "5". Section 4 stores information of up to 25 weights of cells surrounding the cell with highest peak C. In this case, there are only 19 cells. Section 5 contains all zeros. Referring to FIG. 9, the test characters are drawn in a 19×19 lattice (221) using a mouse as the input device. After the input character is completed, the system displays 12 cell planes of S1 (222) on the screen, then 8 cell planes of C1 (223). Referring to FIG. 10, next the ICS layer displays a 3-D figure (230) generated by the character with two cell planes of S2, one of which (231) indicates where the ends of the character are located specified and the other of which (232) shows local peaks. Shown in FIG. 10 (233) is a contour map which is an alternative depiction of the altitudes shown in (230).

Figure 11:
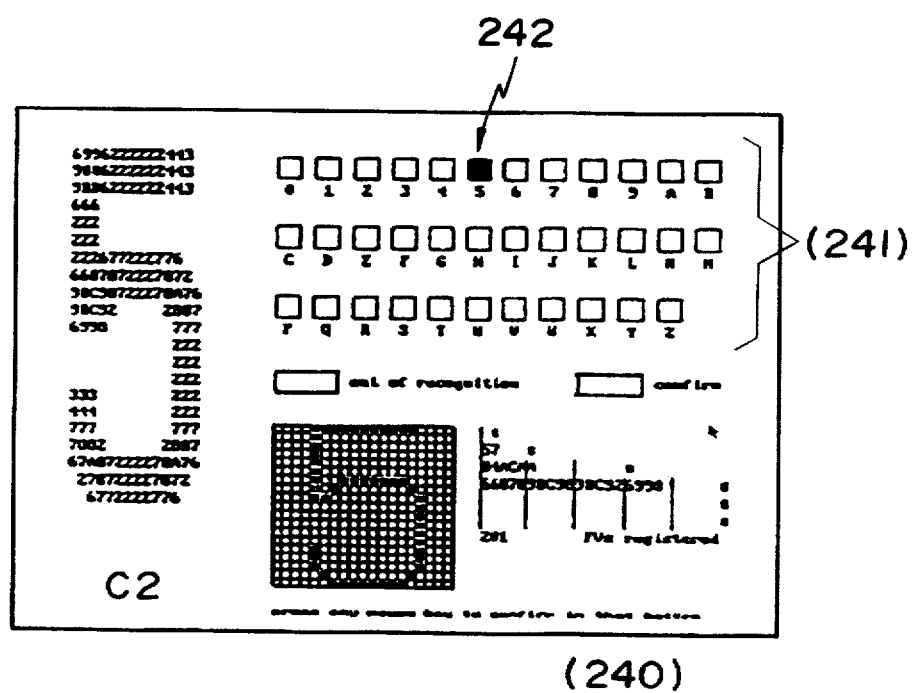

Finally referring to FIG. 11, a display screen (240) shows 35 graphical boxes (241) each of which represents an English alphanumeric character. The direct recognition process of APRD is carried out as follows. If the system indicates that it has identified the test character (see box for "5" (242)) and the operator determines that the identification result is correct, APRD then searches the library to see whether or not there is the exact same feature vector (ignoring unit 0) already in the library. If it is not, the feature vector is added to the Feature Library. If it is already in the library, APRD will check the identification of both feature vectors specified by the content of unit 0. If the two unit 0's do not agree, there is a conflict between these two feature vectors and the one in the library will override the new feature vector. If the identification result is incorrect, the operator may manually correct the identification by clicking the mouse on the box which represents the desired character, thus teaching APRD the correct character.

Figure 12:
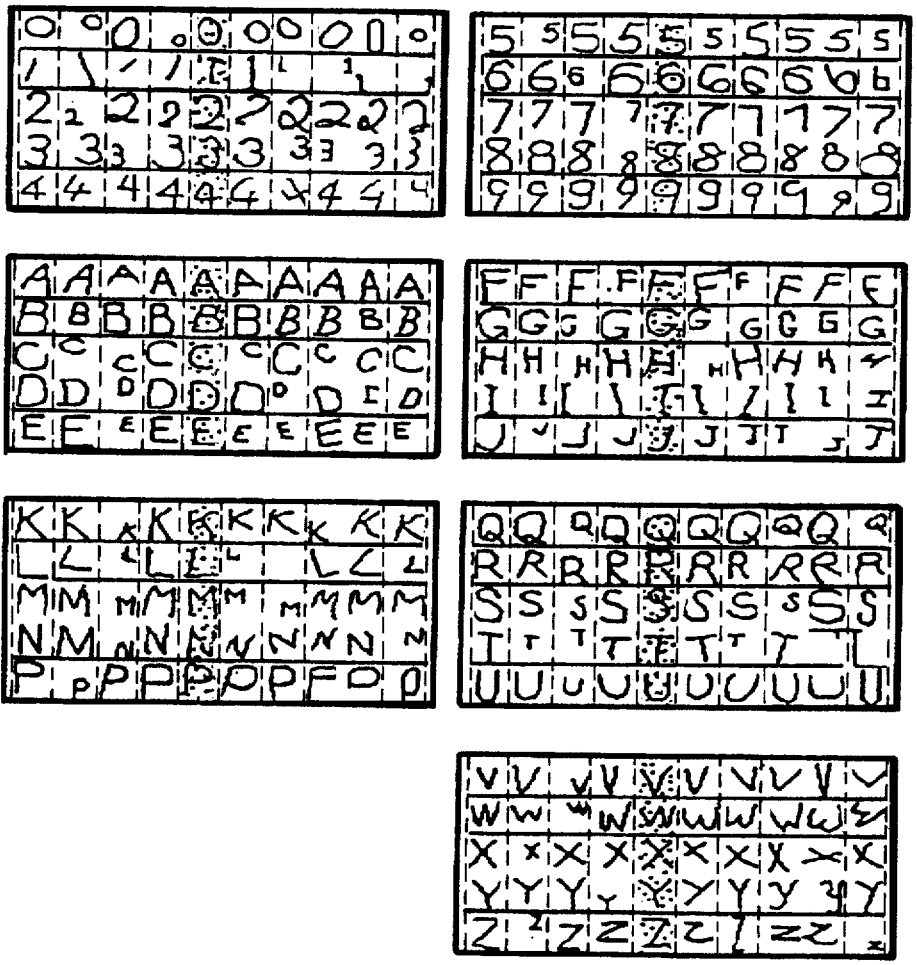
FIG. 12 Illustrates a number of patterns which APRD can recognize.

In some cases, direct recognition may result in no matches or multiple matches. In either case, we must identify the desired match. As a result, APRD is taught and it will subsequently recognize correctly if it encounters the same feature vector. The experimental version can, however, identify a wide range of characters as shown on FIG. 12.

As can be seen from the above description, it is possible to implement and use the invention simply and easily by programming a general purpose computer, (an example of such software being provided in the appendix and providing the computer with a suitable input device, such as a mouse, scanner or graphic table, and output device such as a monitor or printer.

Thus, there has been described a neural-network system for OCR, implemented on a general purpose computer, using a novel method of feature extraction which generates a vector from a test character by sequentially applying masks to the character and producing a measure of the character's "altitude", or degree of fit with those masks, and a manner of making and using the invention. The system has a number of novel features, which involve the generation of a three-dimensional locational information and a third dimension representing "altitude". The advantage of the invention is the resultant improvement in shift-, scale-, and rotation-invariance, at reasonable cost.

Neocognitron is almost impossible to implement in practice because of the complexity of appropriate selection of pattern training sets. Rather than relying heavily on training patterns, APRD uses a feature vector approach to determine unique features each character possesses and extracts such features from a target pattern to recognize the character. In order to extract these elements, two masking processes are applied to produce a desired feature vector which characterizes the test pattern. APRD then compares the feature vector to a feature library of feature vectors, which can be edited, stored in memory and updated, for example if a feature vector generated by a new character is not in the dictionary.

Since a 2-D pattern is specified by two coordinates (x,y), it is generally very difficult to achieve translation-invariance, scale-invariance and rotation invariance in 2-D without invoking auxiliary methods. Neocognitron tries to alleviate this problem by using a hierarchial multi-layered network consisting of a cascade of many layers of neural-like cells where the number of layers depends the complexity of characters to be recognized. This approach does not work well due to inherent limitations of a 2-D structure. The APRD approach overcomes many difficulties encountered in Neocognitron, particularly, shift invariance, scale invariance and distortion/deformation invariance. It cuts down the number of layers required for Neocognitron from 8 (S1, C1, S1, C2, S2, C2, S3, C3, S4, C4) to 4 layers (S1, C1, S2, C2) which saves at least 60% of the neurons from Neocognitron when the impact layer $U_o$ is 19×19 size. The more neurons can be saved when the impact layer size is expanded. It can be implemented on common personal computer configurations such as a 386 class PC.

Note that a feature vector does not depend upon the location and size of the target pattern. As a result, APRD offers the advantage that it is shift-invariant as well as scale-invariant.

Since APRD is scale-invariant, the size of the character to be recognized is irrelevant. Thus, normalization is not required. This feature is a significant advantage in computer implementation because it eliminates the need to revise feature vectors or the feature library to account for character size.

The invention has been described in detail with respect to the recognition of a 2-dimensional character. It can similarly be applied for recognition of patterns of any number of dimensions. There are two approaches. In the first approach, multiple two-dimensional slices of the pattern are taken, preferably mutually orthogonal, and each two-dimensional slice is used to generate a three-dimensional feature vector using the technique already described in detail. Matching then is accomplished by matching each three-dimensional feature vector against a feature library. Alternatively, since a feature vector is not constrained to three dimensions, recognition can take place directly, using the techniques previously described, by generating an (n+1)-dimensional feature vector from an n-dimensional target pattern using a suitable masking technique, and comparing the (n+1) dimensional feature vector to an (n+1)-dimensional feature library.

While a specific embodiment of the invention has been shown and described in detail to illustrate the application of the principles of the invention, it will be understood that the principles and that various modifications, alternate constructions, and equivalents will occur to those skilled in the art given the benefit of this disclosure. Thus, the invention is not limited to the specific embodiment described herein, but is defined by the appended claims.

```
/*  UOS1.C
                            Youguang Xu
                            Nov. 23, 1993               */ include  <dos.h>
include  <graphics.h>
#include  <conio.h>
#include  <stdio.h>
#include  <stdlib.h>
#include  "u0s1.h"

void main(void)
{
  int       g_driver, g_mode, g_error, ox, oy;
  int       i, j, k, m, x, y, cr, kc, kr, mx, my, tx, ty;
  char      s1t[19][19], mkt[19][19];

clrscr();
  clears1(S1COL, S1ROW, S1PAG, s1);
  rfu0file(u0out, U0COL, U0ROW, u0);
  mksmp(S1COL, S1ROW, S1PAG, u0, s1);
  wafs1file(s1out, "w", S1COL, S1ROW, S1PAG, s1);
  exit(0);
} void mksmp(int i, int j, int k, char u[19][19], char
s[12][19][19])
{
  int       cd;

for (k = 0; k < S1PAG; k++)   { for (j = 0; j < S1ROW - 1; j++)   {
      for (i = 0; i < S1COL - 1; i++)   {
      if (u[j][i] == '*')   {
        switch(k)   {
            case 0: if (u[j   ][i + 1] == '*')    s[0][j][i] =
'*';
         case 6:    if (u[j + 1][i    ] == '*')   s[6][j][i] =
'*';
            case 9:    if (u[j + 1][i + 1] == '*')    s[9][j][i]
= '*';
         default:   break;
        }
      }
     }
    } for (j = 0; j < S1ROW - 1; j++)   {
      for (i = 1; i < S1COL; i--)   {
      if (u[j][i] == '*')   {
        switch(k)   {
```

```
                    s[0][j][i] = '#';
                }
            }
        }
        break;
    } case 1: {
        for (j = 1; j < S1ROW; j++) {
            for (i = 1; i < S1COL - 1; i++) {
                if (u[j][i] == '*') {
                    if ((u[j][i - 1] == '*') && (u[j - 1][i + 1] == '*'))
                    {
                        s[1][j][i] = '#';
                    }
                }
            }
        }
        break;
    } case 2: {
        for (j = 0; j < S1ROW - 1; j++) {
            for (i = 1; i < S1COL - 1; i++) {
                if (u[j][i] == '*') {
                    if ((u[j][i + 1] == '*') && (u[j + 1][i - 1] == '*'))
                    {
                        s[2][j][i] = '#';
                    }
                }
            }
        }
        break;
    } case 3: {
        for (j = 1; j < S1ROW - 1; j++) {
            for (i = 1; i < S1COL - 1; i++) {
                if (u[j][i] == '*') {
                    if ((u[j - 1][i + 1] == '*') && (u[j + 1][i - 1] ==
'*'))    {
                        s[3][j][i] = '#';
                    }
                }
            }
        }
        break;
    } case 4: {
        for (j = 1; j < S1ROW - 1; j++) {
            for (i = 1; i < S1COL; i++) {
                if (u[j][i] == '*') {
```

```
        for (i = 0; i < S1COL - 1; i++)    {
            if (u[j][i] == '*')    {
            if ((u[j - 1][i] == '*') && (u[j + 1][i + 1] == '*'))
{
                s[8][j][i] = '#';
                }
            }
        }
    }
      break;
    } case 9:  {
    for (j = 1; j < S1ROW - 1; j++)    {
      for (i = 1; i < S1COL - 1; i++)    {
            if (u[j][i] == '*')    {
            if ((u[j - 1][i - 1] == '*') && (u[j + 1][i + 1] ==
'*'))    {
                s[9][j][i] = '#';
                }
            }
        }
    }
      break;
    } case 10: {
    for (j = 0; j < S1ROW - 1; j++)    {
      for (i = 1; i < S1COL - 1; i++)    {
            if (u[j][i] == '*')    {
            if ((u[j][i - 1] == '*') && (u[j + 1][i + 1] == '*'))
{
                s[10][j][i] = '#';
                }
            }
        }
    }
      break;
    } case 11: {
    for (j = 1; j < S1ROW; j++)    {
      for (i = 1; i < S1COL - 1; i++)    {
            if (u[j][i] == '*')    {
            if ((u[j - 1][i - 1] == '*') && (u[j][i + 1] == '*'))
{
                s[11][j][i] = '#';
                }
            }
        }
    }
    break;
    }
}
```

```
    int         i, j;
    char        ch;
    FILE        *fr;

fr = fopen(cname, "r");
    for (j = 0; j < rw; j++)    {
        for (i = 0; i < cl; i++)    {
            fscanf(fr, "%c", &a[j][i]);
        }
        fscanf(fr, "%c", &ch);
    }
    fscanf(fr, "%c", &ch);
    fscanf(fr, "%c", &ch);
    fclose(fr);
}
```

```
/*   S1C1.C
                              Youguang Xu
                              Nov. 23, 1993              */ include   <dos.h>
include   <graphics.h>
#include   <conio.h>
#include   <stdio.h>
#include   <stdlib.h>
#include   <math.h>
#include   "s1c1.h"

void main(void)
{
   int        g_driver, g_mode, g_error, ox, oy;
   int        i, j, k, m, cx, cy, fx, fy, cr, kr, kc, x, y, mx,
my, tx, ty;
   int        lx[8][2], ly[8][2];
   char       slt[19][19], clt[21][21];

clrscr();
   clearc1(C1COL, C1ROW, C1PAG, c1);
   rfs1file(s1out, S1COL, S1ROW, S1PAG, s1);
   mks1c1(S1COL, S1ROW, S1PAG, s1, c1);
   wafc1file(c1out, "w", C1COL, C1ROW, C1PAG, c1);
   closegraph();
   exit(0);
} void mks1c1(int scl, int srw, int spg, char s[12][19][19], char
c[8][21][21])
{
   int        i, j, k, ck;
   char        clt[21][21];

for (k = 0; k < spg; k++)   {
      for (j = 0; j < srw; j++)    {
      for (i = 0; i < scl; i++)    {
         switch(k)    {
         case 0:
         case 3:
         case 6:
         case 9:
         {
                  ck = k*2/3;
                  c[ck][j + 1][i + 1] = s[k][j][i];
                  break;
         }
         case 1:
         case 4:
         case 7:
```

```c
/*   C1S2.C
                       Youguang Xu
                       Nov. 23, 1993              */ include   <dos.h>
include   <graphics.h>
#include   <conio.h>
#include   <stdio.h>
#include   <stdlib.h>
#include   "c1s2.h"

void main(void)
{
   int        g_driver, g_mode, g_error, ox, oy;
   int        i, j, k, m, cx, cy, fx, fy, cr, kr, kc, x, y, mx,
my, tx, ty;
   int        lx[8][2], ly[8][2];
   char       cpt[21][21], ctm[21][21], stab[10], cb[1];

clrscr();
   clears2(S2COL, S2ROW, S2PAG, s2);
   rfu0file(u0out, U0COL, U0ROW, u0);
   rfu0file(u1out, U0COL, U0ROW, u1);
   rfc1file(c1out, C1COL, C1ROW, C1PAG, c1);
   mkc1s2(c1, cpt, stab, s2);
   wafcptfile(cptout, "w", CPTCOL, CPTROW, cpt);
   wafs2file(s2out, "w", S2COL, S2ROW, S2PAG, s2);
   mcpt(cptmout, cpt);
   closegraph();
   exit(0);
} void mkc1s2(char c[8][21][21], char cct[21][21], char stb[10],
            char s[3][21][21])
{
   int        ks, sm, i, j, k, m, p, cr, nx, cd1, cd2, n[10];
   char       ct, cd, stm[21][21];

for (j = 0; j < C1ROW; j++)   {
      for (i = 0; i < C1COL; i++)   {
         sm = 0;
         for (k = 0; k < C1PAG; k++)   {
            switch(c[k][j][i]) {
              case ' ':    { sm += 0;    break;   }
              case '*':    { sm += 1;    break;   }
              case '#':    { sm += 2;    break;   }
              default:     break;
            }
         }
         switch(sm)   {
             case 0:   { ct = ' ';    break;   }
```

```
                case 1:   { ct = '1';   break;  }
                case 2:   { ct = '2';   break;  }
                case 3:   { ct = '3';   break;  }
                case 4:   { ct = '4';   break;  }
                case 5:   { ct = '5';   break;  }
                case 6:   { ct = '6';   break;  }
                case 7:   { ct = '7';   break;  }
                case 8:   { ct = '8';   break;  }
                case 9:   { ct = '9';   break;  }
                case 10:  { ct = 'A';   break;  }
                case 11:  { ct = 'B';   break;  }
                case 12:  { ct = 'C';   break;  }
                case 13:  { ct = 'D';   break;  }
                case 14:  { ct = 'E';   break;  }
                case 15:  { ct = 'F';   break;  }
                case 16:  { ct = 'G';   break;  }
                default: break;
            }
            cct[j][i] = ct;
        }
    } for (i = 0; i < 10; i++)   n[i] = 0;

for (j = 0; j < C1ROW; j++)   {
        for (i = 0; i < C1COL; i++)   {
            switch(cct[j][i])  {
                case '3':      {        stb[0] = '3';
                                 s[0][j][i] = '3';
                                 n[0] = 1;
                                 break;   }
                case '5':  {    stb[2] = '5';
                                 s[2][j][i] = '5';
                                 n[2] = 1;
                                 break;   }
                default:  break;
            }
        }
    } for (j = 0; j < S2ROW; j++) {
        for (i = 0; i < S2COL; i++)   {
            stm[j][i] = ' ';
        }
    } for (k = 0; k < S2PAG; k++)   {
        if ((k == 0) && (n[k] != 0)) {
          n[k] = 0;
            for (j = 0; j < S2ROW; j++)   {
                for (i = 0; i < S2COL; i++)  {
                if (((i > 0) && (i < (S2COL - 1)))
                && (s[k][j][i - 1] == stb[k])
                && (s[k][j][i    ] == stb[k]))
```

```
            && (s[k][j][i + 1] == stb[k]))
          if ((j == (S2ROW - 1)) || ((cct[j - 1][i] != ' ')
           && ((cct[j + 1][i] == ' ') || (cct[j - 1][i] ==
'3'))) {
                  if (stm[j - 1][i] == '1')     stm[j - 1][i] =
'2';
                  if (stm[j - 1][i] == '5')     stm[j - 1][i] =
'4';
            if (stm[j - 1][i] == ' ')    {
                    if ((cct[j - 1][i + 1] == '6')
                      && (cct[j - 2][i + 1] == '6')
              && (cct[j - 2][i - 1] == '7'))    {
                    stm[j - 2][i] = '4';      n[k]++;
                 }
                 else   {
                    if ((cct[j - 1][i - 1] == '6')
                      && (cct[j - 2][i - 1] == '6')
                      && (cct[j - 2][i + 1] == '7'))    {
                          stm[j - 2][i] = '2';     n[k]++;
              }
              else   {
                  stm[j - 1][i] = '3';    n[k]++;
              }
            }
          }
        }
        if ((j == 0) || ((cct[j + 1][i] != ' ')
           && ((cct[j - 1][i] == ' ') || (cct[j - 1][i] ==
'3')))) {
                  if (stm[j + 1][i] == '1')     stm[j + 1][i] =
'8';
            if (stm[j + 1][i] == '5')     stm[j + 1][i] = '6';
            if (stm[j + 1][i] == ' ')    {
                    if ((cct[j + 1][i + 1] == '6')
                      && (cct[j + 2][i + 1] == '6')
                      && (cct[j + 2][i - 1] == '7'))    {
                          stm[j + 2][i] = '6';     n[k]++;
              }
            else   {
              if ((cct[j + 1][i - 1] == '6')
                    && (cct[j + 2][i - 1] == '6')
              && (cct[j + 2][i + 1] == '7'))    {
                          stm[j + 2][i] = '8';     n[k]++;
              }
                  else   {
                 stm[j + 1][i] = '7';    n[k]++;
              }
            }
          }
        }
      }
      if ((j > 0) && (j < (S2ROW - 1))
       && (s[k][j - 1][i] == stb[k])
       && (s[k][j    ][i] == stb[k])
```

```
                 && (s[k][j + 1][i] == stb[k]))         {
                 if ((i == 0) || ((cct[j][i + 1] != ' ')
                 && ((cct[j][i - 1] == ' ') || (cct[j][i - 1] ==
'3'))))    {
                      if (stm[j][i + 1] == '3')       stm[j][i + 1] =
'2';
                   if (stm[j][i + 1] == '7')       stm[j][i + 1] = '8';
                   if (stm[j][i + 1] == ' ')     {
                           if ((cct[j - 1][i + 1] == '6')
                        && (cct[j - 1][i + 2] == '6')
                        && (cct[j + 1][i + 2] == '7'))          {
                                stm[j][i + 2] = '8';     n[k]++;
                        }
                        else      {
                      if ((cct[j + 1][i + 1] == '6')
                   && (cct[j + 1][i + 2] == '6')
                           && (cct[j - 1][i + 2] == '7'))        {
                                stm[j][i + 2] = '2';     n[k]++;
                        }
                        else   {
                           stm[j][i + 1] = '1';    n[k]++;
                        }
                    }
                 }
              }
              if ((i == (S2COL - 1)) || ((cct[j][i - 1] != ' ')
              && ((cct[j][i + 1] == ' ') || (cct[j][i + 1] ==
'3'))))    {
                      if (stm[j][i - 1] == '3')       stm[j][i - 1] =
'4';
                   if (stm[j][i - 1] == '7')       stm[j][i - 1] =
'6';
                if (stm[j][i - 1] == ' ')      {
                        if ((cct[j - 1][i - 1] == '6')
                     && (cct[j - 1][i - 2] == '6')
                     && (cct[j + 1][i - 2] == '7'))         {
                               stm[j][i - 2] = '6';    n[k]++;
                     }
                        else    {
                           if ((cct[j + 1][i - 1] == '6')
                         && (cct[j + 1][i - 2] == '6')
                         && (cct[j - 1][i - 2] == '7'))        {
                     stm[j][i - 2] = '4';    n[k]++;
                }
                         else    {
                         stm[j][i - 1] = '5';   n[k]++;
                        }
                    }
                 }
              }
           }
        }
     }
   }
}
```

```
            if ((k == 2) && (n[k] != 0))    {
    n[k] = 0;
    for (j = 0; j < S2ROW; j++)   {
        for (i = 0; i < S2COL; i++)    {
            if ((i > 0) && (i < (S2COL - 1))
                && (s[k][j][i - 1] == stb[k])
                && (s[k][j][i    ] == stb[k])
                && (s[k][j][i + 1] == stb[k]))    {
                if (((j == 0) || (cct[j - 1][i] == ' '))
                    && (((cct[j + 1][i - 1] == '7') && (cct[j + 2][i - 1] == '7'))
                    || ((cct[j + 1][i - 1] == '8') && (cct[j + 2][i - 1] == '9'))))
                {
                    if (cct[j + 4][i + 1] == '2')   {
                        stm[j + 1][i] = '8';          n[k]++;
                    }
                    else   {
                        stm[j + 2][i] = '1';          n[k]++;
                    }
                }
                if (((j == (S2ROW - 1)) || (cct[j + 1][i] == ' '))
                    && (((cct[j - 1][i - 1] == '7') && (cct[j - 2][i - 1] == '7'))
                    || ((cct[j - 1][i - 1] == '8') && (cct[j - 2][i - 1] == '9'))))
                {
                    if (cct[j - 4][i + 1] == '2')   {
                        stm[j - 1][i] = '2';          n[k]++;
                    }
                    else   {
                        stm[j - 2][i] = '1';          n[k]++;
                    }
                }
                if (((j == 0) || (cct[j - 1][i] == ' '))
                    && (((cct[j + 1][i + 1] == '7') && (cct[j + 2][i + 1] == '7'))
                    || ((cct[j + 1][i + 1] == '8') && (cct[j + 2][i + 1] == '9'))))
                {
                    if (cct[j + 4][i - 1] == '2')   {
                        stm[j + 1][i] = '6';          n[k]++;
                    }
                    else   {
                        stm[j + 2][i] = '5';          n[k]++;
                    }
                }
                if (((j == (S2ROW - 1)) || (cct[j + 1][i] == ' '))
                    && (((cct[j - 1][i - 1] == '7') && (cct[j - 2][i + 1] == '7'))
                    || ((cct[j - 1][i + 1] == '8') && (cct[j - 2][i + 1] == '9'))))
                {
                    if (cct[j - 4][i - 1] == '2')   {
```

```
                                stm[j - 1][i] = '4';           n[k]++;
                        else    {
                          stm[j - 2][i] = '5';                 n[k]++;
                }
              }
            }
        if ((j > 0) && (j < (S2ROW - 1))
            && (s[k][j - 1][i] == stb[k])
            && (s[k][j    ][i] == stb[k])
            && (s[k][j + 1][i] == stb[k]))   {
              if (((i == 0) || (cct[j][i - 1] == ' '))
                && (((cct[j - 1][i + 1] == '7') && (cct[j - 1][i +
2] == '7'))
                || ((cct[j - 1][i + 1] == '8') && (cct[j - 1][i + 2]
== '9'))))
                  {
                    if (cct[j + 1][i + 4] == '2')  {
                            stm[j][i + 1] = '8';               n[k]++;
                    }
                    else    {
                            stm[j][i + 2] = '7';               n[k]++;
                    }
              }
              if (((i == (S2COL - 1)) || (cct[j][i + 1] == ' '))
                && (((cct[j - 1][i - 1] == '7') && (cct[j - 1][i -
2] == '7'))
                || ((cct[j - 1][i - 1] == '8') && (cct[j - 1][i -
2] == '9'))))
                  {
                    if (cct[j + 1][i - 4] == '2')  {
                            stm[j][i - 1] = '6';               n[k]++;
                    }
                else    {
                    stm[j][i - 2] = '7';                       n[k]++;
                    }
              }
              if (((i == 0) || (cct[j][i - 1] == ' '))
                && (((cct[j + 1][i + 1] == '7') && (cct[j + 1][i +
2] == '7'))
                || ((cct[j + 1][i + 1] == '8') && (cct[j + 1][i +
2] == '9'))))
                  {
                    if (cct[j - 1][i + 4] == '2')  {
                            stm[j][i + 1] = '2';               n[k]++;
                    }
                else    {
                    stm[j][i + 2] = '3';                       n[k]++;
                    }
              }
              if (((i == (S2COL - 1)) || (cct[j][i + 1] == ' '))
                && (((cct[j + 1][i - 1] == '7') && (cct[j + 1][i -
2] == '7'))
                || ((cct[j + 1][i - 1] == '8') && (cct[j + 1][i -
```

```
2] == '9']))))
            {
            if (cct[j - 1][i - 4] == '2') {
                        stm[j][i - 1] = '4';            n[k]++;
            }
                else    {
                    stm[j][i - 2] = '3';            n[k]++;
                }
            }
        }
    }
  }
} for (j = 0; j < S2ROW; j++) {
            for (i = 0; i < S2COL; i++)    {
            s[0][j][i] = stm[j][i];
            }
        } if (k >= 3)        break;
} k = 1;   nx = 0;
  for (j = 1; j < S2ROW; j++)    {
        for (i = 1; i < S2COL; i++)    {
            cd = cct[j][i];
            if ((((i < (S2COL - 1)) && (j < (S2ROW - 1))
                && (cd >= cct[j - 1][i - 1]) && (cd >= cct[j -
1][i])
                && (cd >= cct[j - 1][i + 1]) && (cd >= cct[j][i - 1])
                && (cd > cct[j][i + 1]) && (cd > cct[j + 1][i - 1])
                && (cd > cct[j + 1][i]) && (cd > cct[j + 1][i + 1]))
                || ((i == (S2COL - 1)) && (j < (S2ROW - 1))
                && (cd >= cct[j - 1][i - 1]) && (cd >= cct[j -
1][i])
                && (cd >= cct[j][i - 1]) && (cd > cct[j + 1][i - 1])
                && (cd > cct[j + 1][i]))
                || ((j == (S2ROW - 1)) && (i < (S2COL - 1))
                && (cd >= cct[j - 1][i - 1]) && (cd >= cct[j -
1][i])
                && (cd >= cct[j - 1][i + 1]) && (cd >= cct[j][i - 1])
                && (cd > cct[j][i + 1]))
                || ((i == (S2COL - 1)) && (j == (S2ROW - 1))
                && (cd >= cct[j - 1][i - 1]) && (cd >= cct[j - 1][i])
                && (cd >= cct[j][i - 1])))
            && (cd > '3'))        {
                s[k][j][i] = cct[j][i];
                nx++;
            }
        }
  }
  n[k] = nx;
}
```

```
void mcpt(char cname[12], char ct[21][21])
{
  int        i, j, k;
  int        rw = 21, cl = 21;
  char       ch;
  FILE       *fw;

fw = fopen(cname, "w");
  for (j = 0; j < rw; j++)    {
      for (i = 0; i < cl; i++)    {
        switch(ct[j][i])  {
            case ' ':  { k = 0;  break; }
            case '1':  { k = 1;  break; }
            case '2':  { k = 2;  break; }
            case '3':  { k = 3;  break; }
            case '4':  { k = 4;  break; }
            case '5':  { k = 5;  break; }
            case '6':  { k = 6;  break; }
            case '7':  { k = 7;  break; }
            case '8':  { k = 8;  break; }
            case '9':  { k = 9;  break; }
            case 'A':  { k = 10; break; }
            case 'B':  { k = 11; break; }
            case 'C':  { k = 12;      break; }
            case 'D':  { k = 13; break; }
            case 'E':  { k = 14; break; }
            case 'F':  { k = 15; break; }
            case 'G':  { k = 16;      break; }
            default:   { k = 0;  break; }
        }
        fprintf(fw, "%2d ", k);
      }
      fprintf(fw, "\n");
  }
  fprintf(fw, "\n\n");
  fclose(fw);
} void clears2(int cl, int rw, int pg, char s[3][21][21])
{
  int    i, j, k;

for (k = 0; k < pg; k++)    {
      for (j = 0; j < rw; j++)    {
        for (i = 0; i < cl; i++)    {
            s[k][j][i] = ' ';
        }
      }
  }
}
```

```c
void rfu0file(char cname[12], int cl, int rw, char a[21][21])
{
   int        i, j;
   char       ch;
   FILE       *fr;

fr = fopen(cname, "r");
   for (j = 0; j < rw; j++)   {
      for (i = 0; i < cl; i++)   {
         fscanf(fr, "%c", &a[j][i]);
      }
      fscanf(fr, "%c", &ch);
   }
   fscanf(fr, "%c", &ch);
   fscanf(fr, "%c", &ch);
   fclose(fr);
} void rfc1file(char cname[12], int cl, int rw, int pg, char
c[8][21][21])
{
   int        i, j, k;
   char       ch;
   FILE       *fr;

fr = fopen(cname, "r");
   for (k = 0; k < pg; k++)   {
      for (j = 0; j < rw; j++)   {
         for (i = 0; i < cl; i++)   {
            fscanf(fr, "%c", &c[k][j][i]);
         }
         fscanf(fr, "%c", &ch);
      }
      fscanf(fr, "%c", &ch);
      fscanf(fr, "%c", &ch);
   }
   fscanf(fr, "%c", &ch);
   fscanf(fr, "%c", &ch);
   fscanf(fr, "%c", &ch);
   fclose(fr);
} void wafcptfile(char cname[12], char fn[1], int cl, int rw, char
ct[21][21])
{
   int    i, j;
   FILE   *fw;

fw = fopen(cname, fn);
   for (j = 0; j < rw; j++)   {
      for (i = 0; i < cl; i++)   {
         fprintf(fw, "%c", ct[j][i]);
```

```c
    }
    fprintf(fw, "\n");
  }
  fprintf(fw, "\n\n");
  fclose(fw);
} void wafs2file(char cname[12], char fn[1], int cl, int rw, int pg,
            char s[3][21][21])
{
  int    i, j, k;
  FILE   *fw;

fw = fopen(cname, fn);
  for (k = 0; k < pg; k++)   {
     for (j = 0; j < rw; j++)   {
        for (i = 0; i < cl; i++)  {
            fprintf(fw, "%c", s[k][j][i]);
        }
        fprintf(fw, "\n");
     }
     fprintf(fw, "\n\n");
  }
  fprintf(fw, "\n\n\n");
  fclose(fw);
}
```

```
/*   S2C2.C
                                 Youguang Xu
                                 Nov. 23, 1993                    */ include   <dos.h>
include   <graphics.h>
#include   <conio.h>
#include   <stdio.h>
#include   <stdlib.h>
#include   <math.h>
#include   <string.h>
#include   <time.h>
#include   <io.h>
#include   <fcntl.h>
#include   "s2c2.h"

void main(void)
{
  int       g_driver, g_mode, g_error, ox, oy, ax, ay;
  int       out = OUT;
  int       i, j, k, m, cx, cy, fx, fy, x, y, mx, my, flag;
  int       tx, ty, cr, kr, kc, us, th = 16;
  int       lx[8][2], ly[8][2];
  char      cpt[21][21], ctm[21][21], cb[1];
  union     REGS       r;
  static char  name[36] = { '0', '1', '2', '3', '4', '5', '6',
'7', '8', '9',
                  'A', 'B', 'C', 'D', 'E', 'F', 'G', 'H', 'I',
'J',
                  'K', 'L', 'M', 'N', 'P', 'Q', 'R', 'S', 'T',
'U',
                  'V', 'W', 'X', 'Y', 'Z', ' ' };

clrscr();
  clearc2(C2COL, C2ROW, c2);
  rfu0file(u0out, U0COL, U0ROW, u0);
  rfcptfile(cptout, CPTCOL, CPTROW, cpt);
  rfs2file(s2out, S2COL, S2ROW, S2PAG, s2);

detectgraph( &g_driver, &g_mode );
  initgraph( &g_driver, &g_mode, "BGI" );
  setviewport( 0, 0, getmaxx(), getmaxy(), 1 );

drawlattics(U0OX, U0OY, U0COL, U0ROW, U0WD, U0HG);
  refreshall(U0OX, U0OY, U0COL, U0ROW, U0WD, U0HG, u0);

setcolor(1);
  for (m = 0; m < 3; m++)     {
     for (k = 0; k < 12; k++)    {
        if ((m > 1) && (k > 10))     break;
        rectangle( k*32+C2OX, m*64+C2OY,
                   k*32+C2OX+C2WD, m*64+C2OY+C2HG );
        gotoxy(k*4+30, m*4+5);
```

```
        printf("%c", name[m*12+k]);
      }
  } setcolor(4);
  rectangle( C2OX, C2OY+198, C2OX+C2WD+32, C2OY+198+C2HG );
  gotoxy(37, 16);    printf("unrecognized");

setcolor(10);
  rectangle( C2OX+224, C2OY+198, C2OX+224+C2WD+32, C2OY+198+C2HG
);
  gotoxy(65, 16);    printf("save data");

setcolor(11);
  rectangle( C2OX+224, C2OY+293, C2OX+224+C2WD+32, C2OY+293+C2HG
);
  gotoxy(65, 22);    printf("pass");

mks2c2(u0, cpt, s2, c2, chcd, name);

gotoxy(29,19);         printf("%c#", chcd[0]);
  gotoxy(29,20);
  for (i = 1; i < 6; i++)     printf("%c", chcd[i]);
  printf("#");
  gotoxy(29,21);
  for (i = 6; i < 21; i++)    printf("%c", chcd[i]);
  printf("#");
  gotoxy(29,22);
  for (i = 21; i < 46; i++)   {
     printf("%c", chcd[i]);
  }
  printf("#");
  gotoxy(45, 21);
  for(i = 0; i < 4; i++) printf("%c", chcd[46+i]);
  printf("#");

setcolor(14);
  line(399 - 8*22, 290, 399 - 8*22, 335+th);
  line(439 - 8*22, 320, 439 - 8*22, 335+th);
  line(479 - 8*22, 320, 479 - 8*22, 335+th);
  line(519 - 8*22, 335, 519 - 8*22, 335+th);
  line(559 - 8*22, 335, 559 - 8*22, 335+th);
  refreshac2(C2OX, C2OY, C2COL, C2ROW, 32, 64, c2);

setcolor(7);
  settextstyle(0, 0, 1);
  outtextxy( 150, 420, "press left  mouse key to confirm in that
bottom" );
  outtextxy( 150, 430, "       right mouse key to come back
previous screen" );

flag = 0;
  mx = 0; my = 0;
```

```
r.x.ax = 0;    int86( 0x33, &r, &r );
for ( ; ; ) {
    r.x.ax = 1;    int86( 0x33, &r, &r );
    r.x.ax = 3;    int86( 0x33, &r, &r );
    while ((r.x.bx != 1) && (r.x.bx != 2)) {
        r.x.ax = 3;    int86( 0x33,&r,&r );
    }
    r.x.ax = 2;    int86( 0x33, &r, &r );

ax = r.x.cx;            ay = r.x.dx;
    if (r.x.bx == 1)    {
        cx = ((ax - C2OX) % 32);    mx = (ax - C2OX)/32;
        cy = ((ay - C2OY) % 62);    my = (ay - C2OY)/62;
        if(((cx >= 0) && (cx <= C2WD)) && ((cy >= 0) && (cy <=
C2HG))
            && ((mx <= 12) && (my <= 2)) && ((mx >= 0) && (my >=
0))) {
            setfillstyle( 0, 2);
            bar(C2OX+1, C2OY+198+1, C2OX+C2WD+32 - 1, C2OY+198+C2HG
- 1);
            clearc2(C2COL, C2ROW, c2);
            refreshac2(C2OX, C2OY, C2COL, C2ROW, 32, 64, c2);
            setfillstyle( 2, 9);
            bar(C2OX+mx*32+1, C2OY+my*64+1,
                C2OX+mx*32+C2WD - 1, C2OY+my*64+C2HG - 1);
            if ( !((mx == 11) && (my == 2)))    {
                c2[35] = '1';
                chcd[0] = name[my*12 + mx];
                gotoxy(29,19); printf("%c#", chcd[0]);
                waflearning(learn, chcd, c2);
                wasmu0(smu0, u0, cpt, chcd);
                c2[my*12 + mx] = '9';
                refreshac2(C2OX, C2OY, C2COL, C2ROW, 32, 64, c2);
                delay(1000);
            }
            break;
        }
        cx = ax - C2OX - 224;
        cy = ay - C2OY - 198;
        if(((cx >= 0) && (cx <= (C2WD+32))) && ((cy >= 0)
            && (cy <= C2HG)))        {
            setfillstyle(1, 10);
            bar(C2OX+224+1, C2OY+198+1,
                C2OX+224+C2WD-32 - 1, C2OY+198+C2HG - 1);
            for (i = 0; i < out; i++)        {
                if (c2[i] == '9')        chcd[0] = name[i];
            }
            waflearning(learn, chcd, c2);
            wasmu0(smu0, u0, cpt, chcd);
            delay(1000);
            break;
        }
        if ((ax >= (C2OX+224)) && (ax <= (C2OX+224+C2WD+32))
            && (ay >= (C2OY+293)) && (ay <= (C2OY+293+C2HG)))
```

```
            break;
        }
        if (r.x.bx == 2)    {
            flag = 1; break;
        }
    }
    closegraph();
    if (flag == 1)    exit(5);
    else              exit(0);
} void mks2c2(char u[21][21], char cp[21][21], char s[2][21][21], char c[36],
            char cs[50], char nm[36])
{
    int         i, j, k, x, y, np, mx, nx, fi, si;
    int         n[17], by[17], st[36];
    int         cl = 21, rw = 21, out = 36;
    long        ts;
    char        tm[5], pk[15], ct[23][23], v[5][5];
    char        rs, ca, ch, jg, tc[1];
    struct feature
    {   int  x[15];
        int  y[15];
    } f[16];

for (i = 0; i < 17; i++)    { n[i] = 0;    by[i] = 0; }
    for (i = 0; i < 36; i++)    { st[i] = 0; }
    for (i = 0; i < 5; i++)     { tm[i] = ' '; }
    for (i = 0; i < 15; i++)    { pk[i] = ' '; }
    for (i = 0; i < 50; i++)    { cs[i] = ' '; }
    for (j = 0; j < 23; j++)    {
        for (i = 0; i < 23; i++)        {
            ct[j][i] = ' ';
        }
    }
    for (j = 0; j < 16; j++)    {
        for (i = 0; i < 15; i++)    {
            f[j].x[i] = 0;        f[j].y[i] = 0;
        }
    }
    for (j = 0; j < 5; j++)         {
        for (i = 0; i < 5; i++)         {
            v[j][i] = ' ';
        }
    } for (j = 0; j < rw; j++)    {
        for (i = 0; i < cl; i++)    {
            ca = s[0][j][i];
            if (ca != ' ')    {
                tm[n[3]] = ca;
                f[3].x[n[3]] = i;        f[3].y[n[3]] = j;
```

```
            n[3]++;
        }
    }
} np = 0;
for (j = 0; j < rw; j++)    {
    for (i = 0; i < cl; i++)    {
        ca = s[1][j][i];
        if (ca != ' ')    {
            pk[np] = ca;  np++;
            switch(ca)    {
            case 'G': { f[16].x[n[16]] = i;
                        f[16].y[n[16]] = j;
                        n[16]++;    break;
            }
            case 'F': { f[15].x[n[15]] = i;
                        f[15].y[n[15]] = j;
                        n[15]++;    break;
            }
            case 'E': { f[14].x[n[14]] = i;
                        f[14].y[n[14]] = j;
                        n[14]++;    break;
            }
            case 'D': { f[13].x[n[13]] = i;
                        f[13].y[n[13]] = j;
                        n[13]++;    break;
            }
            case 'C': { f[12].x[n[12]] = i;
                        f[12].y[n[12]] = j;
                        n[12]++;    break;
            }
            case 'B': { f[11].x[n[11]] = i;
                        f[11].y[n[11]] = j;
                        n[11]++;    break;
            }
            case 'A': { f[10].x[n[10]] = i;
                        f[10].y[n[10]] = j;
                        n[10]++;    break;
            }
            case '9': { f[9].x[n[9]] = i;
                        f[9].y[n[9]] = j;
                        n[9]++; break;
            }
            case '8': { f[8].x[n[8]] = i;
                        f[8].y[n[8]] = j;
                        n[8]++; break;
            }
            case '7': { f[7].x[n[7]] = i;
                        f[7].y[n[7]] = j;
                        n[7]++; break;
            }
            case '6': { f[6].x[n[6]] = i;
                        f[6].y[n[6]] = j;
```

```
                        n[6]++; break;
                    }
            case '5': { f[5].x[n[5]] = i;
                        f[5].y[n[5]] = j;
                        n[5]++; break;
                    }
            case '4': { f[4].x[n[4]] = i;
                        f[4].y[n[4]] = j;
                        n[4]++; break;
                    }
            default:  break;
            }
        }
    }
} by[16] = n[16];
for (i = 16; i > 3; --i)    { by[i] = by[i+1] + n[i]; } for (j = 0; j < rw; j++)    {
    for (i = 0; i < cl; i++)        {
        ct[j + 1][i + 1] = cp[j][i];
    }
} for (j = 16; j > 3; j--)    {
    if (n[j] > 0) {
    x = f[j].x[0] + 1;      y = f[j].y[0] + 1;
    v[0][0] = ct[y - 2][x - 2];
    v[0][1] = ct[y - 2][x - 1];
    v[0][2] = ct[y - 2][x    ];
    v[0][3] = ct[y - 2][x + 1];
    v[0][4] = ct[y - 2][x + 2];
    v[1][0] = ct[y - 1][x - 2];
    v[1][1] = ct[y - 1][x - 1];
    v[1][2] = ct[y - 1][x    ];
    v[1][3] = ct[y - 1][x + 1];
    v[1][4] = ct[y - 1][x + 2];
    v[2][0] = ct[y    ][x - 2];
    v[2][1] = ct[y    ][x - 1];
    v[2][2] = ct[y    ][x    ];
    v[2][3] = ct[y    ][x + 1];
    v[2][4] = ct[y    ][x + 2];
    v[3][0] = ct[y + 1][x - 2];
    v[3][1] = ct[y + 1][x - 1];
    v[3][2] = ct[y + 1][x    ];
    v[3][3] = ct[y + 1][x + 1];
    v[3][4] = ct[y + 1][x + 2];
    v[4][0] = ct[y + 2][x - 2];
    v[4][1] = ct[y + 2][x - 1];
    v[4][2] = ct[y + 2][x    ];
    v[4][3] = ct[y + 2][x + 1];
    v[4][4] = ct[y + 2][x + 2];
    if ((n[3] != 0) && (f[3].y[0] >= f[j].y[0]))       cs[48] =
```

```
'1';
        else                                cs[48] = ' ';
        break;
        }
    } for (i = 0; i < 5; i++)      { cs[i + 1] = tm[i]; }
    for (i = 0; i < 15; i++)     { cs[i + 6] = pk[i]; }
    for (j = 0; j < 5; j++)      {
        for (i = 0; i < 5; i++) {
            cs[j*5 + i + 21] = v[j][i];
        }
    }
} if (n[3] != 0)       {
    jg = ' ';
    x = f[3].x[0] - 1;        y = f[3].y[0] - 1;
    for (i = 0; i < x; i++)      {
        if ( (u[y    ][i    ] == '*')
          && ((u[y - 1][i - 1] == '*')
           || (u[y - 1][i    ] == '*')
           || (u[y - 1][i + 1] == '*'))
          && ((u[y + 1][i - 1] == '*')
           || (u[y + 1][i    ] == '*')
           || (u[y + 1][i + 1] == '*')))            jg = '1';
    }
    cs[46] = jg;
    jg = ' ';
    x = f[3].x[1] - 1;        y = f[3].y[1] - 1;
    for (i = 0; i < x; i++)      {
        if ((u[y    ][i    ] == '*')
          && ((u[y - 1][i - 1] == '*')
           || (u[y - 1][i    ] == '*')
           || (u[y - 1][i + 1] == '*'))
          && ((u[y - 1][i - 2] == '*')
           || (u[y - 1][i + 2] == '*')
           || (u[y - 2][i - 2] == '*')
           || (u[y - 2][i - 1] == '*')
           || (u[y - 2][i    ] == '*')
           || (u[y - 2][i + 1] == '*')
           || (u[y - 2][i + 2] == '*')))    jg = '1';
        if  ((u[y    ][i    ] == '*')
          && ((u[y - 1][i - 1] == '*')
           || (u[y - 1][i    ] == '*')
           || (u[y - 1][i + 1] == '*'))
          && ((u[y + 1][i - 1] == '*')
           || (u[y + 1][i    ] == '*')
           || (u[y + 1][i + 1] == '*')))    jg = '1';
        if  ((u[y    ][i    ] == '*')
          && ((u[y + 1][i - 1] == '*')
           || (u[y + 1][i    ] == '*')
           || (u[y + 1][i + 1] == '*'))
          && ((u[y + 1][i - 2] == '*')
           || (u[y + 1][i + 2] == '*')
```

```
                 || (u[y + 2][i - 2] == '*')
                 || (u[y + 2][i - 1] == '*')
                 || (u[y + 2][i    ] == '*')
                 || (u[y + 2][i + 1] == '*')
                 || (u[y + 2][i + 2] == '*')))          jg = '1';
        }
        cs[47] = jg;
    } if (tm[0] != ' ')  ts = atol(tm);
    else               ts = 0;

switch(n[3]) {
      case 0:         {
        if (by[14] >= 1)                                st[11]++;   /* B */
        if (((n[12] + n[13]) >= 2) && (by[14] == 0))    st[8]++;
/* 8 */
        if ((n[11] == 2) && (by[13] == 0))              st[13]++;
/* D */
        if ((by[12] == 0)  && (n[11] < 2))              st[0]++;
/* 0 */
        break;
      } case 1:         {
        if ((((ts == 4) || (ts == 5) || (ts == 6)
             || ((ts == 3) && (by[10] >= 5))
             || ((ts == 7) && (by[10] <= 4)))
            && (cs[48] == ' '))                         st[6]++;    /* 6 */
        if (((((ts == 8)
             || (((ts == 7) || (ts == 1)) && (by[10] >= 5)))
             || (((ts == 3) || (ts == 2)) && (by[10] <= 5)
            && (cs[34] > cs[31]))) && (cs[48] == '1'))  st[9]++;    /*
9 */
        if ((((((ts == 2) || (ts == 3))
            && (by[10] <= 5) && (cs[34] < cs[31]))
             || ((ts == 4)
            && (by[9] < 4))) && (cs[48] == '1'))        st[24]++;
/* P */
        if ((ts == 1) && (by[10] <= 4))                 st[13]++;
  /* D */
        if ((((ts == 4) || (ts == 5))
            && (by[9] >= 4) && (cs[48] == '1'))         st[25]++;
/* Q */
        break;
      } case 2:         {
        if ((((ts == 72) || (ts == 73) || (ts == 62)
            || (ts == 63))
            && (by[10] == 0) && (cs[46] == ' '))        st[1]++;
/* 1 */
        if (((ts == 53)
            && ((n[12] + n[13]) == 2) && (n[14] == 1)
```

```
                || (u[y + 2][i - 2] == '*')
                || (u[y + 2][i - 1] == '*')
                || (u[y + 2][i    ] == '*')
                || (u[y + 2][i + 1] == '*')
                || (u[y + 2][i + 2] == '*')))          jg = '1';
      }
      cs[47] = jg;
   }
   if (tm[0] != ' ') ts = atol(tm);
   else              ts = 0;
   switch(n[3]) {
     case 0:     {
       if (by[14] >= 1)                             st[11]++;     /* B */
       if (((n[12] + n[13]) >= 2) && (by[14] == 0))      st[8]++;
 /* 8 */
       if ((n[11] == 2) && (by[13] == 0))                st[13]++;
 /* D */
       if ((by[12] == 0)  && (n[11] < 2))                st[0]++;
 /* 0 */
       break;
     }
     case 1:     {
       if (((ts == 4) || (ts == 5) || (ts == 6)
         || ((ts == 3) && (by[10] >= 5))
         || ((ts == 7) && (by[10] <= 4)))
        && (cs[48] == ' '))                         st[6]++;      /* 6 */
       if ((((ts == 8)
         || (((ts == 7) || (ts == 1)) && (by[10] >= 5)))
         || (((ts == 3) || (ts == 2)) && (by[10] <= 5)
        && (cs[34] > cs[31]))) && (cs[48] == '1')) st[9]++;      /*
9 */
       if (((((ts == 2) || (ts == 3))
       && (by[10] <= 5) && (cs[34] < cs[31]))
        || ((ts == 4)
      && (by[9] < 4))) && (cs[48] == '1'))             st[24]++;
/* P */
       if ((ts == 1) && (by[10] <= 4))                    st[13]++;
  /* D */
       if (((ts == 4) || (ts == 5))
        && (by[9] >= 4) && (cs[48] == '1'))            st[25]++;
 /* Q */
       break;
     }
     case 2:     {
       if (((ts == 72) || (ts == 73) || (ts == 62)
        || (ts == 63))
      && (by[10] == 0) && (cs[46] == ' '))             st[1]+-;
/* 1 */
       if ((ts == 53)
        && ((n[12] + n[13]) == 2) && (n[14] == 1
```

```
                && (cs[48] == ' '))                 st[4]++;      /* 4 */
        if (((ts == 12) || (ts == 13) || (ts == 23))
                && (by[11] == 1) && (by[14] == 0))              st[7]++;
/* 7 */
        if (((ts == 75) || (ts == 65))
                && ((n[11] + n[12] + n[13]) == 1)
                && (by[14] == 0))                   st[21]++;    /* L */
        if (((ts == 14) || (ts == 15) || (ts == 16))
                && ((n[12] +n[13]) >= 1) && (by[8] <= 4)
                && (cs[46] == ' '))                 st[34]++;    /* Z */
        if (((ts == 51) || (ts == 58) || (ts == 57))
                && ((n[11] > 1) || (by[12] >= 1)
                || ((n[10] + n[11]) == 4))
                && (cs[47] == ' '))                 st[5]++;     /*
5 */
        if (((ts == 35) || (ts == 36) || (ts == 37)
                || (ts == 45) || (ts == 46) || (ts == 47)
                || (ts == 55) || (ts == 56) || (ts == 57))
                && (by[12] == 0) && (by[10] <= 4)
                && (cs[47] == '1'))                 st[12]++;    /* C */
        if (((ts == 41) || (ts == 46) || (ts == 47)
                || (ts == 48) || (ts == 31) || (ts == 37)
                || (ts == 38))
                && (by[12] == 0) && (n[11] <= 2)
                && (cs[47] == ' '))                 st[27]++;    /* S */
        if (((ts == 24) || (ts == 25) || (ts == 26)
                || (ts == 34) || (ts == 35) || (ts == 36))
                && (n[12] <= 2) && (n[13] <= 1)
                && (by[12] >= 1) && (cs[46] == ' ')
                && (cs[48] == ' '))                 st[2]++;
/* 2 */
        if (((ts == 83) || (ts == 84) || (ts == 85)
                || (ts == 13) || (ts == 14) || (ts == 15)
                || (ts == 23) || (ts == 24) || (ts == 25)
                || (ts == 33) || (ts == 34) || (ts == 35)
                || (ts == 74))
                && (by[14] == 1) && ((n[12] + n[13]) < 2)
                && (cs[46] == '1') && (cs[48] == ' ')
                && (by[8] >= 4))                    st[25]++;    /*
Q */
        if (((ts == 73) || (ts == 52) || (ts == 74)
                || (ts == 83))
                && ((n[12] + n[13]) >= 1) && (by[14] == 0))     st[23]++;
/* N */
        if (((ts == 33) || (ts == 13) || (ts == 24)
                || (ts == 43))
                && ((n[12] == 2) || ((n[12] == 1)
                && (n[13] == 1)) && (by[12] == 2)
                && (by[14] == 0))                   st[22]++;    /* M */
        if (((ts == 67) || (ts == 76) || (ts == 77))
                && ((n[10] + n[11]) <= 2) && (by[12] == 0)
                && (cs[47] == '1'))                 st[29]++;    /* U */
        if (((ts == 34) || (ts == 43) || (ts == 24)
                || (ts == 25) || (ts == 53) || (ts == 54)
```

```
             || (ts == 35))
          && (by[12] < 3) && ( !(n[13] == 2))
          && (cs[48] == '1'))                        st[26]++;       /*
R */
          if (((ts == 23) || (ts == 24) || (ts == 33)
           || (ts == 34) || (ts == 43) || (ts == 32)
           || (ts == 42))
          && ((by[12] >= 3) || (n[13] == 2))
          && (cs[48] == '1'))                        st[10]++;       /* A */
          if (((ts == 31) || (ts == 41) || (ts == 51)
           || (ts == 57))
          && (by[14] >= 1) && (cs[47] == '1'))       st[16]++;       /*
G */
          if (((ts == 87) || (ts == 86) || (ts == 77)
           || (ts == 76) || (ts == 78) || (ts == 68)
           || (ts == 67) || (ts == 66))              {
             if (by[12] == 1)                        st[30]++;       /* V */
             if ((by[12] > 1) || (n[10] > 1))        st[31]++;       /* W */
          }
          if (((ts == 11) || (ts == 31))
          && (n[13] == 1) && (cs[47] == ' '))        st[3]++;        /*
3 */
          if ((ts == 53) && (by[13] == 0))           st[9]++;        /*
9 */
          if (((ts == 77) || (ts == 78))
          && (cs[46] == ' ') && (cs[47] == ' ')
          && (by[12] == 0))                          st[19]++;       /* J */
          if ((ts == 11) && (by[14] >= 3))           st[11]++;       /*
B */
          if (((ts == 15) || (ts == 73)
           || (ts == 55))
          && ((n[11] == 2) || (n[13] == 2)))         st[18]++;       /* I */
          break;
        } case 3:   {
          if ((ts == 555) && (by[14] == 1))          st[14]++;       /*
E */
          if (((ts == 553) || (ts == 563) || (ts == 453)
           || (ts == 552) || (ts == 554))
          && (n[14] >= 1))                           st[15]++;       /* F */
          if (((ts == 153) || (ts == 513) || (ts == 523))
          && ((n[14] == 1) || (n[13] == 1))
          && (cs[37] == 'A'))                        st[28]++;       /* T */
          if (((ts == 152) || (ts == 151) || (ts == 158)
           || (ts == 157))
          && ((n[14] == 1) || (n[13] == 1))
          && (cs[37] == 'A'))                        st[19]++;       /* J */
          if (((ts == 111) || (ts == 117) || (ts == 118)
           || (ts == 211) || (ts == 217) || (ts == 218)
           || (ts == 311) || (ts == 317) || (ts == 318)
           || (ts == 811))
          && (by[12] == 1))                          st[3]++;        /* 3 */
          if ((ts == 766) || (ts == 777) || (ts == 778)
```

```
                   || (ts == 787) || (ts == 873) || (ts == 767))       st[31]++;
/* W */
            if ((((ts == 152) || (ts == 153) || (ts == 512)
                || (ts == 513) || (ts == 162) || (ts == 163)
                || (ts == 612) || (ts == 613) || (ts == 172)
                || (ts == 173) || (ts == 712) || (ts == 713)
                || (ts == 628)
                || (ts == 852) || (ts == 853) || (ts == 582)
                || (ts == 583) || (ts == 862) || (ts == 863)
                || (ts == 682) || (ts == 683) || (ts == 872)
                || (ts == 873) || (ts == 782) || (ts == 783)
                || (ts == 752) || (ts == 753) || (ts == 572)
                || (ts == 573) || (ts == 762) || (ts == 763)
                || (ts == 672) || (ts == 673) || (ts == 772)
                || (ts == 773))
             && (((n[ 6] == 1) && (by[ 7] == 0))
                || ((n[ 9] == 1) && (by[10] == 0))
                || ((n[10] == 1) && (by[11] == 0))
                || ((n[11] == 1) && (by[12] == 0))
                || ((n[12] == 1) && (by[13] == 0))
                || (n[15] == 1) || ((n[14] == 1)
             && ((cs[38] == 'D') || (cs[38] == '6')))))       st[33]++;
/* Y */
            if ((ts == 115) && ((n[11] == 1)
              || (n[12] == 1)) && (n[14] == 1))               st[1]++;       /*
1 */
            if (((ts == 653) || (ts == 753) || (ts == 673)
              || (ts == 773))
             && ((n[12] >= 2) || (n[14] == 1)))     st[4]++;       /* 4 */
            if (ts == 463)                          st[9]++;       /* 9 */
            if ((ts == 313) || (ts == 413))         st[16]++;      /*
G */
            if (((ts == 615) || (ts == 715))
             && ((n[11] + n[12] + n[13]) == 1)
             && (by[14] == 0))                      st[21]++;      /* L */
            if ((ts == 733) || (ts == 624))         st[22]++;
/* M */
            if (ts == 816)                          st[34]++;      /* Z */
            break;
         }
         case 4:    {
            if ((((ts == 7733) || (ts == 6733)
              || (ts == 7633) || (ts == 5522)
              || (ts == 7732))
             && (by[12] == 2))                      st[17]++;      /* H */
            if (((ts == 1515) || (ts == 5151))
             && (by[12] == 2))                      st[18]++;      /* I */
            if ((((ts == 7643) || (ts == 6743)
              || (ts == 7634) || (ts == 6734)
              || (ts == 7624) || (ts == 7635)
              || (ts == 6525) || (ts == 6625)
              || (ts == 7535))
             && ((n[13] == 1) || (n[14] == 1)
```

```
             || (n[15] == 1)))                st[20]++;    /* K */
         if (((ts == 7623) || (ts == 7633)
             || (ts == 7632)
             || (ts == 6723) || (ts == 6733)
             || (ts == 6732) || (ts == 6184)
             || (ts == 8525)
             || (ts == 7723) || (ts == 7724)
             || (ts == 7733) || (ts == 7734)
             || (ts == 7732) || (ts == 7742)
                  || (ts == 7743)
             || (ts == 8623) || (ts == 8624)
             || (ts == 8633) || (ts == 8634)
             || (ts == 8632) || (ts == 8642)
             || (ts == 8633) || (ts == 8643)
             || (ts == 8625) || (ts == 8652)
             || (ts == 6823) || (ts == 6824)
             || (ts == 6833) || (ts == 6834)
             || (ts == 6832) || (ts == 6842)
             || (ts == 6833) || (ts == 6843)
             || (ts == 6825) || (ts == 6852)
             || (ts == 8723) || (ts == 8724)
             || (ts == 8733) || (ts == 8734)
             || (ts == 8732) || (ts == 8742)
                  || (ts == 8743)
             || (ts == 7823) || (ts == 7824)
             || (ts == 7833) || (ts == 7834)
             || (ts == 7832) || (ts == 7842)
                  || (ts == 7843))
             && (by[11] == 1))                st[32]++;    /* X */
         if (((ts == 6642) || (ts == 6643)
             || (ts == 6652) || (ts == 6653)
             || (ts == 6662) || (ts == 6663)
             || (ts == 6742) || (ts == 6743)
             || (ts == 6752) || (ts == 6753)
             || (ts == 6762) || (ts == 6763)
             || (ts == 7642) || (ts == 7643)
             || (ts == 7652) || (ts == 7653)
             || (ts == 7662) || (ts == 7663)
             || (ts == 7752) || (ts == 7753)
             || (ts == 5763) || (ts == 8763))
             && (by[14] == 1))                st[4]++;
         if (((ts == 1152) || (ts == 1153))
             && (n[13] >= 1))                 st[7]++;
         break;
       } case 5:  {
         if (cs[48] == ' ')                   st[31]++;    /* W */
         else                                 st[22]++;
/* M */
       } default:  break;
     }
 }
```

```
   mx = 0;
   for (i = 0; i < out; i++)    {
       if(mx < st[i])       mx = st[i];
   } nx = 0;
   for (i = 0; i < out; i++)    {
       if ((mx != 0) && (st[i] == mx))        nx++;
   } if (nx == 0)     {
       clearc2(12, 3, c);
       c[35] = 'A';
   }
   if (nx >= 1)     {
       for (i = 0; i < out; i++)     {
           if (st[i] == mx)    {
               c[i] = '9';      fi = i;
           }
           else       c[i] = ' ';
       }
       if (nx == 1)    c[35] = '1';
       if (nx == 2)    c[35] = 'B';
       if (nx == 3)    c[35] = 'C';
       if (nx == 4)    c[35] = 'D';
       if (nx == 5)    c[35] = 'E';
   } searchtab(learn, cs, tc);
   if (tc[0] != ' ') {
       for (i = 0; i < out; i++)     {
         if (nm[i] == tc[0])       {
              c[i] = '9';       si = i;
         }
         else     c[i] = ' ';
       }
       if ((nx == 0) || (nx > 1) || ((nx == 1) && (si != fi)))
{
       c[35] = '2';    nx = 1;
       }
   }
   else    {
       if (nx == 0)    { gotoxy(1,16);     printf("   have not seen before"); }
   }
} void waflearning(char cname[12], char cs[50], char c[36])
{
   int          i, j, k, n, hdl, flag;
   long         np;
   char         ch[50], cc, fn[2];
   FILE         *fw, *frc, *fr;
```

```
   hdl = open(cname, O_CREAT|O_TEXT);
   np = filelength(hdl)/52;
   close(hdl);

flag = 0;
   for (i = 0; i < 50; i++)     { ch[i] = ' '; } fr = fopen(cname, "rt");
   for (j = 0; j < np; j++)    {
      n = 0;
      for (i = 0; i < 50; i++)          { fscanf(fr, "%c",
&ch[i]); }
      fscanf(fr, "%c", &cc);
      for (i = 1; i < 50; i++)     {
         if (ch[i] == cs[i])      n++;
         else                     break;
      }
      if (n >= 49)    { flag = 1;    break; }
   }
   fclose(fr);

if ((flag == 1) && (ch[0] != cs[0]))    {
      gotoxy(1,16);        printf("   definitions conflict!");
      return;
   }
wrt:
   if ((flag == 0) && (c[35] == '1'))      {
      gotoxy(1,16);        printf("   New one, to register");

fw = fopen(cname, "at+");
      for (i = 0; i < 50; i++)     { fprintf(fw, "%c", cs[i]); }
      fprintf(fw, "\n");
      fclose(fw);
   }
   else           {
      gotoxy(1,16);
      if (flag == 1)     printf("   feature vector existed");
      if (c[35] >= 'A')  printf("   do not register");
   }
} void searchtab(char cname[12], char c[50], char cb[1])
{
   int       i, j, k, n, hd1, hd2;
   long      np1, np2;
   char      ch[50], cc;
   FILE      *frc, *fr;

hdl = open(cname, O_CREAT|O_TEXT);
   np1 = filelength(hd1)/52;
   close(hdl);
   if (np1 == 0)         { cb[0] = ' ';    return; }
```

```c
    hd2 = open("smu0.dat", O_CREAT|O_TEXT);
    np2 = filelength(hd2)/1403;
    close(hd2);
    gotoxy(29,24);    printf("FV = %5ld    SM = %5ld", np1, np2);

for (i = 0; i < 50; i++)    { ch[i] = ' '; } fr = fopen(cname, "rt");
    for (j = 0;  j < np1; j++)  {
        n = 0;
        for (i = 0; i < 50; i++)        fscanf(fr, "%c", &ch[i]);
        fscanf(fr, "%c", &cc);
        for (i = 1; i < 50; i++)    {
            if (ch[i] == c[i])       n++;
         else              break;
        }
        if (n >= 49)   { cb[0] = ch[0];    break; }
        else           { cb[0] = ' '; }
    }
    fclose(fr);
} void rflearning(char cname[12], char c[50])
{
  int        i;
  char    ch;
  FILE        *fr;

fr = fopen(cname, "rt");
  for (i = 0; i < 50; i++)   { fscanf(fr, "%c", &c[i]); }
  fscanf(fr, "%c", &ch);
  fclose(fr);
} void wasmu0(char cname[12], char u[21][21], char ct[21][21], char
cs[50])
{
  int         i, j, k, hd;
  char        ut[21][21], fn[2];
  FILE        *fw;

for (j = 0; j < 21; j++)    {
      for (i = 0; i < 21; i++)    {
       ut[j][i] = ' ';
      }
  } for (j = 0; j < 19; j++)    {
      for (i = 0; i < 19; i++)   {
       ut[j + 1][i + 1] = u[j][i];
      }
```

```c
}
    fw = fopen(cname, "at");
    for (j = 0; j < 21; j++)     {
        fprintf(fw, "|   ");
        for (i = 3; i < 3+21; i++)       fprintf(fw, "%c", ut[j][i - 3]);
        for (i = 24; i <   29; i++) fprintf(fw, " ");
        for (i = 29; i < 29+21; i++)       fprintf(fw, "%c", ct[j][i - 29]);
        fprintf(fw, "   |\n");
    }
    fprintf(fw, "\n|\t#%c#\n|\t#", cs[0]);
    for (i = 0; i < 5; i++)      fprintf(fw, "%c", cs[i+1]);
    fprintf(fw, "#\n|\t#");
    for (j = 0; j < 3; j++)     {
        for (i = 0; i < 5; i++)     {
            fprintf(fw, "%c", cs[6 + j*5 + i]);
        }
        if (j < 2)     fprintf(fw, "|");
    }
    fprintf(fw, "#");
    for(i = 0; i < 4; i++) fprintf(fw, "%c", cs[46+i]);
    fprintf(fw, "#\n");
    fprintf(fw, "|\t#");
    for (j = 0; j < 5; j++)     {
        for (i = 0; i < 5; i++)     {
            fprintf(fw, "%c", cs[21 + j*5 + i]);
        }
        if (j < 4)     fprintf(fw, "|");
    }
    fprintf(fw, "#\n");
    for (j = 0; j < 2; j++)     {
        fprintf(fw, "|");
        for (i = 1; i < 52; i++)       fprintf(fw, " ");
        fprintf(fw, "|\n");
    }
    fprintf(fw, "---");
    for (i = 3; i < 50; i++)      fprintf(fw, " ");
    fprintf(fw, "---\n");
    fclose(fw);
} void refreshlc2(int ox, int oy, int i, int j, int cl, int rw, int wd, int hg,
          char cc[36])
{
    int            ulx, uly, fil, clr;
    char           ch;

if ((i < cl) && (j < rw))     {
        ulx = i*wd + 1 - ox;
        uly = j*hg + 1 - oy;
```

```
        ch = cc[j*cl+i];
        if (ch != ' ')     fil = 1;
        else            fil = 0;
        switch(ch)   {
            case '1':      { clr =  1;    break; }
            case '2':      { clr =  2;    break; }
            case '3':      { clr =  3;    break; }
            case '4':      { clr =  4;    break; }
            case '5':      { clr =  5;    break; }
            case '6':      { clr =  6;    break; }
            case '7':      { clr =  7;    break; }
            case '8':      { clr =  8;    break; }
            case '9':      { clr =  9;    break; }
            case 'A':      { clr = 10;    break; }
              case 'B':        { clr = 11;   break; }
            case 'C':  .   { clr = 12;    break; }
              case 'D':      { clr = 13;   break; }
            case 'E':      { clr = 14;    break; }
            case 'F':      { clr = 15;    break; }
            case 'G': { clr = 15;    break;    }
            default:  break;
        }
          setfillstyle( fil, clr );
      bar( ulx, uly, ulx+C2WD - 2, uly+C2HG - 2 );
    }
} void refreshac2(int ox, int oy, int cl, int rw, int wd, int hg,
char c[36])
{
  int         i, j;
  int         ulx, uly, fil, clr;

for (j = 0; j < rw; j++)    {
      for (i = 0; i < cl; i++)       {
        if ((j > 1) && (i > 10))      break;
        refreshlc2(ox, oy, i, j, cl, rw, wd, hg, c);
       }
  }
  if ( c[35] >= 'A' )     {
     setfillstyle( 1, 4 );
     bar( C2OX+1, 198+C2OY+1, C2OX+C2WD+32 - 1, 198+C2OY+C2HG - 1
);
   }
} void refreshls2(int ox, int oy, int k, int l, int cl, int rw, int
wd, int hg,
          char cc[21][21])
{
  int         ulx, uly, fil, clr;
  char        ct;
```

```
   if ((k < cl) && (l < rw))   {
      ulx = k*wd + 1 + ox;
      uly = l*hg + 1 + oy;
         ct = cc[l][k];
      if (ct != ' ')       fil = 1;
      else           fil = 0;
      switch(ct)   {
            case '1':        { clr =  1;    break;  }
            case '2':        { clr =  2;    break;  }
            case '3':        { clr =  3;    break;  }
            case '4':        { clr =  4;    break;  }
            case '5':        { clr =  5;    break;  }
            case '6':        { clr =  6;    break;  }
            case '7':        { clr =  7;    break;  }
            case '8':        { clr =  8;    break;  }
            case '9':        { clr =  9;    break;  }
            case 'A':        { clr = 10;    break;  }
               case 'B':     { clr = 11;    break;  }
            case 'C':        { clr = 12;    break;  }
               case 'D':     { clr = 13;    break;  }
            case 'E':        { clr = 14;    break;  }
            case 'F':        { clr = 15;    break;  }
            case 'G': { clr = 15;    break;      }
            default:  break;
      }
         setfillstyle( fil, clr );
      bar( ulx, uly, ulx+wd - 4, uly+hg - 4 );
   }
} void refreshas2(int ox, int oy, int cl, int rw, int wd, int hg,
            char c[21][21])
{
  int        i, j, k;
  int        ulx, uly, fil, clr;
  char       ct;

for (j = 0; j < rw; j++)   {
     for (i = 0; i < cl; i++)     {
       refreshls2(ox, oy, i, j, cl, rw, wd, hg, c );
     }
  }
} void clearc2(int cl, int rw, char c[36])
{
  int    i;

for (i = 0; i < rw*cl; i++) c[i] = ' ';
}
```

```c
void rfu0file(char cname[12], int cl, int rw, char a[21][21])
{
   int       i, j;
   char      ch;
   FILE      *fr;

fr = fopen(cname, "r");
   for (j = 0; j < rw; j++)   {
      for (i = 0; i < cl; i++)   {
           fscanf(fr, "%c", &a[j][i]);
      }
      fscanf(fr, "%c", &ch);
   }
   fscanf(fr, "%c", &ch);
   fscanf(fr, "%c", &ch);
   fclose(fr);
} void rfcptfile(char cname[12], int cl, int rw, char a[21][21])
{
   int       i, j;
   char      ch;
   FILE      *fr;

fr = fopen(cname, "r");
   for (j = 0; j < rw; j++)   {
      for (i = 0; i < cl; i++)   {
           fscanf(fr, "%c", &a[j][i]);
      }
      fscanf(fr, "%c", &ch);
   }
   fscanf(fr, "%c", &ch);
   fscanf(fr, "%c", &ch);
   fclose(fr);
} void rfs2file(char cname[12], int cl, int rw, int pg, char
s[2][21][21])
{
   int       i, j, k;
   char      ch;
   FILE      *fr;

fr = fopen(cname, "r");
   for (k = 0; k < pg; k++)   {
      for (j = 0; j < rw; j++)   {
         for (i = 0; i < cl; i++)   {
              fscanf(fr, "%c", &s[k][j][i]);
         }
         fscanf(fr, "%c", &ch);
      }
      fscanf(fr, "%c", &ch);
```

```
    fscanf(fr, "%c", &ch);
  }
  fscanf(fr, "%c", &ch);
  fscanf(fr, "%c", &ch);
  fscanf(fr, "%c", &ch);
  fclose(fr);
} void refreshloc(int ox, int oy, int k, int l, int cl, int rw, int wd, int hg,
           char c[21][21], int cc)
{
  int    ulx, uly, fil, clr;

if ((k < cl) && (l < rw))    {
     ulx = k*wd + 1 + ox;
     uly = l*hg + 1 + oy;
     if (    (c[l][k] == '*') || (c[l][k] == '#')
          || (c[l][k] == '%'))           fil = 1;
     else                                fil = 0;
     if ((cc == 0) && (c[l][k] == '*')) {
         clr = 9;
         setfillstyle( fil, clr );
         bar( ulx, uly, ulx+wd - 4, uly+hg - 4 );
     }
     if ((cc == 1) && (c[l][k] == '#')) {
         clr = 10;
         setfillstyle( fil, clr );
         bar( ulx, uly, ulx+wd - 4, uly+hg - 4 );
     }
     if ((cc == 2) && (c[l][k] == '%')) {
         clr = 13;
         setfillstyle( fil, clr );
         bar( ulx, uly, ulx+wd - 4, uly+hg - 4 );
     }
  }
} void refreshall(int ox, int oy, int cl, int rw, int wd, int hg,
           char c[21][21])
{
  int    i, j, k, cc;

cc = 0;
  for (k = 0; k < 3; k++)     {
     for (j = 0; j < rw; j++)    {
         for (i = 0; i < cl; i++) {
             refreshloc(ox, oy, i, j, cl, rw, wd, hg, c, cc);
         }
     }
     cc++;
  }
```

```
} void drawlattics(int ox, int oy, int cl, int rw, int wd, int hg)
{
  int    i, j;

setcolor(1);
  for (j = 0; j < rw; j++)    {
     for (i = 0; i < cl; i++)    {
          rectangle( i*wd + ox, j*hg + oy,
                 (i+1)*wd - 2 + ox, (j+1)*hg - 2 + oy );
       }
  }
}
```

```c
/*   INU0.C
                           Youguang Xu
                           Nov. 23, 1993            */ include   <dos.h>
include   <graphics.h>
#include   <conio.h>
#include   <stdio.h>
#include   <stdlib.h>
#include   "inu0.h"

void main(void)
{
    int      g_driver, g_mode, g_error, ox, oy;
    int      ax, ay, cx, cy, cx0, cy0, rx, ry, mx, my, i, j;
    int      bl, br, tx, ty, sxk, sxp, sxc, row1, flag;
    union    REGS      r;

clrscr();
    detectgraph( &g_driver, &g_mode );
    initgraph( &g_driver, &g_mode, "BGI" );

ox = U0OX + ((19 - U0COL)/2)*J0WD + (20 - U0WD)*12;
    oy = U0OY + ((19 - U0ROW)/2)*U0HG + (20 - U0HG)*8;
    tx = 20 + (19 - U0COL)/2 + (20 - U0WD)*1.5;
    ty =  3 + (19 - U0ROW)/2 + (20 - U0HG)/2;
    bl = ox + (U0COL+2)*U0WD;
    br = ox + (U0COL+7)*U0WD;
    row1 = U0ROW;

setcolor(15);
    settextstyle( 0, 0, USER_CHAR_SIZE );
    setusercharsize( 2, 1, 2, 1 );
    outtextxy( bl+27, (row1 -  2)*U0HG+6+(U0HG - 10)+oy, "OK" );
    outtextxy( bl+ 8, (row1 -  5)*U0HG+6+(U0HG - 10)+oy, "REPAINT" );
    outtextxy( bl+15, (row1 -  8)*U0HG+6+(U0HG - 10)+oy, "CLEAR" );
    outtextxy( bl+19, (row1 - 11)*U0HG+6+(U0HG - 10)+oy, "LOAD" );
    outtextxy( bl+19, (row1 - 19)*U0HG+6+(U0HG - 10)+oy, "EXIT" );
    setcolor(9);
    rectangle( bl, (row1 -  2)*U0HG+oy, br - 2, (row1 -  0)*U0HG - 2+oy );
    rectangle( bl, (row1 -  5)*U0HG+oy, br - 2, (row1 -  3)*U0HG - 2+oy );
    rectangle( bl, (row1 -  8)*U0HG+oy, br - 2, (row1 -  6)*U0HG - 2+oy );
    rectangle( bl, (row1 - 11)*U0HG+oy, br - 2, (row1 -  9)*U0HG - 2+oy );
    rectangle( bl, (row1 - 19)*U0HG+oy, br - 2, (row1 - 17)*U0HG - 2+oy );
```

```
setcolor(1);
cleararray(U0COL, U0ROW, u0);
refreshall(ox, oy, U0COL, U0ROW, U0WD, U0HG, u0);
drawlattics(ox, oy, U0COL, U0ROW, U0WD, U0HG);

setcolor(7);
settextstyle(0, 0, 3);
outtextxy( 80, oy + 242, "U0" );

r.x.ax = 0;  int86( 0x33, &r, &r );
for ( ; ; )  {
      r.x.ax = 1;  int86( 0x33, &r, &r );
   refreshloc(ox, oy, cx, cy, U0COL, U0ROW, U0WD, U0HG, u0);
   refreshloc(ox, oy, cx0, cy0, U0COL, U0ROW, U0WD, U0HG, u0);

r.x.ax = 3;  int86( 0x33, &r, &r );
   while (r.x.bx == 0) {
         mx = (r.x.cx - ox)/U0WD;
         my = (r.x.dx - oy)/U0HG;
         if ((mx < U0COL) && (my < U0ROW))   {
              gotoxy(tx,ty);
              printf("row =%3d    col =%3d ", my, mx);
         }
         r.x.ax = 3;    int86( 0x33,&r,&r );
         refreshloc(ox, oy, cx0, cy0, U0COL, U0ROW, U0WD, U0HG,
u0);
   }
   r.x.ax = 2;    int86( 0x33, &r, &r );

cx0 = cx;         cy0 = cy;
   ax = r.x.cx;         ay = r.x.dx;
   rx = ax - ox;        ry = ay - oy;
   cx = 0;              cy = 0;
   flag = 0;

if ((((rx >= 0) && (rx <= (U0COL*U0WD)))
       && ((ry >= 0) && (ry <= (U0ROW*U0HG)))
       && ((rx % U0WD) != (U0WD - 1)) && ((ry % U0HG) != (U0HG
- 1))))
      {
         cx = rx/U0WD;   cy = ry/U0HG;
         switch(r.x.bx)  {
           case 1:       u0[cy][cx] = '*';   break;
           case 2:       u0[cy][cx] = ' ';   break;
           default: break;
         }
      } if (((ax >= bl) && (ax <= br))
       && ((ay >= (row1 - 19)*U0HG +oy) && (ay <= (row1 -
17)*U0HG+oy)))
      {
         flag = 1; goto end;
      }
```

```
    if (((ax >= bl) && (ax <= br))
        && ((ay >= (row1 - 11)*U0HG +oy) && (ay <= (row1 -
9)*U0HG+oy)))
        {
            rfu0file(U0OUT, U0COL, U0ROW, u0);
            refreshall(ox, oy, U0COL, U0ROW, U0WD, U0HG, u0);
        } if (((ax >= bl) && (ax <= br))
        && ((ay >= (row1 - 8)*U0HG+oy) && (ay <= (row1 -
6)*U0HG+oy)))
        {
            cleararray(U0COL, U0ROW, u0);
            refreshall(ox, oy, U0CCL, U0ROW, U0WD, U0HG, u0);
            drawlattics(ox, oy, U0COL, U0ROW, U0WD, U0HG);
        } if (((ax >= bl) && (ax <= br))
        && ((ay >= (row1 - 5)*U0HG+oy) && (ay <= (row1 -
3)*U0HG+oy)))
            refreshall(ox, oy, U0COL, U0ROW, U0WD, U0HG, u0);

if (((ax >= bl) && (ax <= br))
        && ((ay >= (row1 - 2)*U0HG+oy) && (ay <= (row1 -
0)*U0HG+oy)))
            break;
    }
    wafu0file(u0out, "w", U0COL, U0ROW, u0);
    do { ; }while(r.x.bx == 0);

end:
    r.x.ax = 2;  int86( 0x33, &r, &r );
    closegraph();
    if (flag == 1)    exit(1);
    else              exit(0);
} void drawlattics(int ox, int oy, int cl, int rw, int wd, int hg)
{
    int    i, j;

setcolor(1);
    for (j = 0; j < rw; j++)    {
        for (i = 0; i < cl; i++)    {
            rectangle( i*wd + ox, j*hg + oy,
                       (i+1)*wd - 2 + ox, (j+1)*hg - 2 + oy );
        }
    }
} void refreshloc(int ox, int oy, int k, int l, int cl, int rw, int
wd, int hg,
```

```
              char a[21][21])
{
  int    ulx, uly, fil;

if ((k < cl) && (l < rw))    {
     ulx = ox + k*wd + 1;              uly = oy + l*hg + 1;
     if (a[l][k] == '*')  fil = 1;
        else              fil = 0;
     setfillstyle( fil, 9 );
     bar( ulx, uly, ulx+wd - 4, uly+hg - 4 );
  }
} void refreshall(int ox, int oy, int cl, int rw, int wd, int hg,
               char a[21][21])
{
  int    i, j;

for (j = 0; j < rw; j++)    {
     for (i = 0; i < cl; i++)  {
        refreshloc(ox, oy, i, j, cl, rw, wd, hg, a);
     }
  }
} void cleararray(int cl, int rw, char a[21][21])
{
  int    i, j;

for (j = 0; j < rw; j++)    {
     for (i = 0; i < cl; i++)  {
        a[j][i] = ' ';
     }
  }
} void wafu0file(char cname[12], char fn[1], int cl, int rw, char
a[21][21])
{
  int    i, j;
  FILE   *fw;

fw = fopen(cname, fn);
  for (j = 0; j < rw; j++)    {
     for (i = 0; i < cl; i++)  {
        fprintf(fw, "%c", a[j][i]);
     }
     fprintf(fw, "\n");
  }
  fprintf(fw, "\n\n");
  fclose(fw);
```

```
} void rfu0file(char cname[12], int cl, int rw, char a[21][21])
{
   int        i, j;
   char       ch;
   FILE       *fr;

fr = fopen(cname, "r");
   for (j = 0; j < rw; j++)    {
      for (i = 0; i < cl; i++)   {
         fscanf(fr, "%c", &a[j][i]);
      }
      fscanf(fr, "%c", &ch);
   }
   fscanf(fr, "%c", &ch);
   fscanf(fr, "%c", &ch);
   fclose(fr);
}
```

```
/*    INU0.H
                             Youguang Xu
                             Nov. 23, 1993         */ define        U0COL    19
define        U0ROW       19
#define        U0OX 140
#define        U0OY 60
#define        U0WD 14
#define        U0HG 14
#define        U0OUT       "u0.dat"

void refreshloc(int ox, int oy, int k, int l, int cl, int rw, int wd, int hg,
          char a[21][21]);
void refreshall(int ox, int oy, int cl, int rw, int wd, int hg,
          char a[21][21]);
void cleararray(int cl, int rw, char a[21][21]);
void drawlattics(int ox, int oy, int cl, int rw, int wd, int hg);
void wafu0file(char cname[12], char fn[1], int cl, int rw, char a[21][21]);
void rfu0file(char cname[12], int cl, int rw, char a[21][21]);
void movechar(char a[21][21], int ox, int oy);
void movech(char a[21][21], int ox, int oy);
void prtarray(int cl, int rw, char a[21][21]);
void exit(int i);

char     u0[21][21];
char     u0out[12] = U0OUT;
```

```
/*   U0S1.H
                               Youguang Xu
                               Nov. 23, 1993           */ define       U0COL   19
define       U0ROW     19
#define       U00X 0
#define       U00Y 320
#define       U0WD 8
define       U0HG 8 define       S1PAG    12
define       S1COL   19
#define       S1ROW     19
#define       S1OX 160
#define       S1OY 40
#define       S1WD 6
#define       S1HG 6
#define       U0OUT      "u0.dat"
#define       S1OUT      "s1.dat"

char          u0[19][19];
char          s1[12][19][19];
char          u0out[20] = U0OUT;
char          s1out[20] = S1OUT;

static char   mk1[12][3][3] = {   ' ',' ',' ',
                                  '*','*','*',
                                  ' ',' ',' ', ' ',' ','*',
                                  '*','*',' ',
                                  ' ',' ',' ', ' ',' ',' ',
                                  ' ','*','*',
                                  '*',' ',' ', ' ',' ','*',
                                  ' ','*',' ',
                                  '*',' ',' ', ' ','*',' ',
                                  ' ',' ',' ',
                                  '*',' ',' ', ' ',' ','*',
                                  ' ',' ',' ',
                                  ' ','*',' ', ' ','*',' ',
                                  ' ','*',' ',
                                  ' ',' ',' ',
```

```
                           '*',' ',' ',
   ' ','*',' ',' ',
   ' ','*',' ',' ',

' ','*',' ',' ',
   ' ','*',' ',' ',
   ' ',' ','*',' ',

'*',' ',' ',' ',
   ' ','*',' ',' ',
   ' ',' ','*',' ',

' ',' ',' ',' ',
   '*','*',' ',' ',
   ' ',' ','*',' ',

'*',' ',' ',' ',
   ' ','*','*',' ',
   ' ',' ',' ',' ',     };
```

```
void refreshloc(int ox, int oy, int k, int l, int cl, int rw, int wd, int hg,
           char a[19][19]);
void refreshall(int ox, int oy, int cl, int rw, int wd, int hg,
           char a[19][19]);
void wafslfile(char cname[20], char fn[1], int cl, int rw, int pg,
           char s[12][19][19]);
void mksmp(int i, int j, int k, char u[19][19], char s[12][19][19]);
void drawlattics(int ox, int oy, int cl, int rw, int wd, int hg);
void rfu0file(char cname[20], int cl, int rw, char a[19][19]);
void clearsl(int cl, int rw, int pg, char s[12][19][19]);
void exit(int i);
```

```
/*   S1C1.H
                            Youguang Xu
                            Nov. 23, 1993        */ define      U0COL    19
define      U0ROW       19
#define      U0OX 5
#define      U0OY 340
#define      U0WD 6
#define      U0HG 6
#define      U0OUT     "u0.dat"
#define      U1OUT     "u1.dat"

#define      S1PAG    12
#define      S1COL    19
#define      S1ROW       19
#define      S1OX 10
#define      S1OY 200
#define      S1WD 6
#define      S1HG 6
#define      S1OUT     "s1.dat"

#define      C1PAG    8
#define      C1COL    21
#define      C1ROW       21
#define      C1OX 123
#define      C1OY 50
#define      C1WD 6
#define      C1HG 6
#define      C1OUT     "c1.dat"

char         u0[21][21];
char      u1[21][21];
char         s1[12][19][19];
char         c1[8][21][21];
char         u0out[12] = U0OUT;
char         u1out[12] = U1OUT;
char         s1out[12] = S1OUT;
char         c1out[12] = C1OUT;

void refreshloc(int ox, int oy, int k, int l, int cl, int rw, int
wd, int hg,
         char c[21][21], int cc);
void refreshall(int ox, int oy, int cl, int rw, int wd, int hg,
         char c[21][21]);
void wafc1file(char cname[12], char fn[1], int cl, int rw, int
pg,
         char c[8][21][21]);
void mks1c1(int sc1, int srw, int spg, char s[12][19][19], char
c[8][21][21]);
void drawlattics(int ox, int oy, int cl, int rw, int wd, int hg);
void rfu0file(char cname[12], int cl, int rw, char a[21][21]);
void rfs1file(char cname[12], int cl, int rw, int pg, char
s[12][19][19]);
```

```
void clearcl(int cl, int rw, int pg, char c[8][21][21]);
void prtarray(int cl, int rw, int pg, char c[8][21][21]);
void exit(int i);
```

```
/*   C1S2.H
                         Youguang Xu
                         Nov. 23, 1993          */ define      U0COL    19
define      U0ROW       19
#define      U0OX 20
#define      U0OY 8
#define      U0WD 3
#define      U0HG 3
#define      U0OUT       "u0.dat"
#define      U1OUT       "u1.dat"

#define      C1PAG    8
#define      C1COL    21
#define      C1ROW       21
#define      C1OX 100
#define      C1OY 5
#define      C1WD 3
#define      C1HG 3
#define      C1OUT       "c1.dat"

#define      CPTCOL   21
#define      CPTROW      21
#define      CPTOUT      "cpt.dat"
#define      CPTMOUT "mcpt.dat"

#define      S2PAG    3
#define      S2COL    21
#define      S2ROW       21
#define      S2OX 350
#define      S2OY 112
#define      S2WD 8
#define      S2HG 8
#define      S2OUT       "s2.dat"

char         u0[21][21];
char      u1[21][21];
char         c1[8][21][21];
char         cpt[21][21];
char         s2[3][21][21];
char      u0out[12]   = U0OUT;
char      u1out[12]   = U1OUT;
char      c1out[12]   = C1OUT;
char          cptout[12]   = CPTOUT;
char      s2out[12]   = S2OUT;
char      cptmout[12] = CPTMOUT;

void mkc1s2(char c[8][21][21], char cct[21][21], char stb[10],
       char s[3][21][21]);
void rfu0file(char cname[12], int cl, int rw, char a[21][21]);
void rfc1file(char cname[12], int cl, int rw, int pg, char
c[9][21][21]);
```

```
void refreshloc(int ox, int oy, int k, int l, int cl, int rw, int wd, int hg,
        char c[21][21], int cc);
void refreshall(int ox, int oy, int cl, int rw, int wd, int hg,
        char c[21][21]);
void wafcptfile(char cname[12], char fn[1], int cl, int rw, char ct[21][21]);
void clears2(int cl, int rw, int pg, char s[3][21][21]);
void refreshls2(int ox, int oy, int k, int l, int cl, int rw, int wd, int hg,
        char cc[21][21]);
void refreshas2(int ox, int oy, int cl, int rw, int wd, int hg,
        char c[21][21]);
void wafs2file(char cname[12], char fn[1], int cl, int rw, int pg,
        char s[3][21][21]);
void mcpt(char cname[12], char ct[21][21]);
void drawlattics(int ox, int oy, int cl, int rw, int wd, int hg);
void exit(int i);
```

```
/*   S2C2.H
                              Youguang Xu
                              Nov. 23, 1993           */ define     U0COL    19
define     U0ROW        19
#define     U0OX 34
#define     U0OY 40
#define     U0WD 8
#define     U0HG 8
#define     U0OUT    "u0.dat"
#define     U1OUT    "u1.dat"

#define     CPTCOL   21
#define     CPTROW       21
#define     CPTOUT   "cpt.dat"

#define     S2PAG    2
#define     S2COL    21
#define     S2ROW        21
#define     S2OX 180
#define     S2OY 280
#define     S2WD 6
#define     S2HG 6
#define     S2OUT    "s2.dat"

#define     C2PAG    1
#define     C2COL    12
#define     C2ROW        3
#define     C2OX 225
#define     C2OY 40
#define     C2WD 20
#define     C2HG 20
#define     C2OUT    "c2.dat"

#define     IN   100
#define         HD   20
#define         OUT  36
#define         NP   100
#define         LEARN    "learn.dat"
#define         SMU0 "smu0.dat"

char         u0[21][21];
char     u1[21][21];
char         cpt[21][21];
char         s2[2][21][21];
char            c2[36];
char            chcd[50];
char         u0out[12]   = U0OUT;
char         u1out[12]   = U1OUT;
char         cptout[12]  = CPTOUT;
char         s2out[12]   = S2OUT;
char         c2out[12]   = C2OUT;
char         learn[12]   = LEARN;
```

```
char      smu0[12]   = SMU0;

void mks2c2(char u[21][21], char cp[21][21], char s[2][21][21],
char c[36],
          char cs[50], char nm[36]);
void searchtab(char cname[12], char c[50], char cb[1]);
void rfu0file(char cname[12], int cl, int rw, char a[21][21]);
void refreshloc(int ox, int oy, int k, int l, int cl, int rw, int
wd, int hg,
          char c[21][21], int cc);
void refreshall(int ox, int oy, int cl, int rw, int wd, int hg,
          char c[21][21]);
void rfcptfile(char cname[12], int cl, int rw, char a[21][21]);
void rfs2file(char cname[12], int cl, int rw, int pg, char
s[2][21][21]);
void refreshls2(int ox, int oy, int k, int l, int cl, int rw, int
wd, int hg,
          char cc[21][21]);
void refreshas2(int ox, int oy, int cl, int rw, int wd, int hg,
          char c[21][21]);
void prtarray(int cl, int rw, int pg, char s[2][21][21]);
void clearc2(int cl, int rw, char c[36]);
void refreshlc2(int ox, int oy, int i, int j, int cl, int rw, int
wd, int hg,
          char cc[36]);
void refreshac2(int ox, int oy, int cl, int rw, int wd, int hg,
char c[36]);
void waflearning(char cname[12], char cs[50], char c[36]);
void rflearning(char cname[12], char c[50]);
void wasmu0(char cname[12], char u[21][21], char ct[21][21], char
cs[50]);
void drawlattics(int ox, int oy, int cl, int rw, int wd, int hg);
void exit(int i);
```

```
/*  UOS1.C
                            Youguang Xu
                            Nov. 23, 1993              */ include   <dos.h>
include   <graphics.h>
#include   <conio.h>
#include   <stdio.h>
#include   <stdlib.h>
#include   "u0s1.h"

void main(void)
{
  int        g_driver, g_mode, g_error, ox, oy;
  int        i, j, k, m, x, y, cr, kc, kr, mx, my, tx, ty;
  char       s1t[19][19], mkt[19][19];

clrscr();
  clears1(S1COL, S1ROW, S1PAG, s1);
  rfu0file(u0out, U0COL, U0ROW, u0);
  mksmp(S1COL, S1ROW, S1PAG, u0, s1);
  wafs1file(s1out, "w", S1COL, S1ROW, S1PAG, s1);
  exit(0);
} void mksmp(int i, int j, int k, char u[19][19], char
s[12][19][19])
{
  int        cd;

for (k = 0; k < S1PAG; k++)   { for (j = 0; j < S1ROW - 1; j++)   {
      for (i = 0; i < S1COL - 1; i++)   {
      if (u[j][i] == '*')   {
        switch(k)   {
            case 0: if (u[j    ][i + 1] == '*')   s[0][j][i] =
'*';
            case 6:   if (u[j + 1][i    ] == '*')   s[6][j][i] =
'*';
            case 9:     if (u[j + 1][i + 1] == '*')   s[9][j][i]
= '*';
            default:  break;
        }
      }
     }
    } for (j = 0; j < S1ROW - 1; j++)   {
      for (i = 1; i < S1COL; i++)   {
      if (u[j][i] == '*')   {
        switch(k)   {
```

```
            case 0: if (u[j    ][i - 1] == '*')   s[0][j][i] =
'*';
       case 3:    if (u[j + 1][i - 1] == '*')   s[3][j][i] =
'*';
         case 6:      if (u[j + 1][i    ] == '*')   s[6][j][i]
= '*';
        default:   break;
      }
    }
   }
  } for (j = 1; j < S1ROW; j++)   {
    for (i = 0; i < S1COL - 1; i++)   {
    if (u[j][i] == '*')    {
      switch(k)    {
            case 0: if (u[j    ][i + 1] == '*')   s[0][j][i] =
'*';
       case 3:    if (u[j - 1][i + 1] == '*')   s[3][j][i] =
'*';
       case 6:    if (u[j - 1][i    ] == '*')   s[6][j][i] =
'*';
        default:   break;
      }
    }
   }
  } for (j = 1; j < S1ROW; j++)   {
    for (i = 1; i < S1COL; i++)   {
    if (u[j][i] == '*')    {
      switch(k)    {
            case 0:    if (u[j    ][i - 1] == '*')   s[0][j][i] =
'*';
       case 6:    if (u[j - 1][i    ] == '*')   s[6][j][i] =
'*';
       case 9:    if (u[j - 1][i - 1] == '*')   s[9][j][i] =
'*';
        default:   break;
      }
     }
    }
   }
  } for (k = 0; k < S1PAG; k++)   {
    switch(k)   { case 0:   {
     for (j = 0; j < S1ROW; j++)   {
       for (i = 1; i < S1COL - 1; i++)    {
         if (u[j][i] == '*')    {
         if ((u[j][i - 1] == '*') && (u[j][i + 1] == '*'))
    {
```

```
                    s[0][j][i] = '#';
                }
            }
        }
    }
        break;
    } case 1: {
    for (j = 1; j < S1ROW; j++) {
        for (i = 1; i < S1COL - 1; i++) {
            if (u[j][i] == '*') {
                if ((u[j][i - 1] == '*') && (u[j - 1][i + 1] == '*'))
{
                    s[1][j][i] = '#';
                }
            }
        }
    }
        break;
    } case 2: {
    for (j = 0; j < S1ROW - 1; j++) {
        for (i = 1; i < S1COL - 1; i++) {
            if (u[j][i] == '*') {
                if ((u[j][i + 1] == '*') && (u[j + 1][i - 1] == '*'))
{
                    s[2][j][i] = '#';
                }
            }
        }
    }
        break;
    } case 3: {
    for (j = 1; j < S1ROW - 1; j++) {
        for (i = 1; i < S1COL - 1; i++) {
            if (u[j][i] == '*') {
                if ((u[j - 1][i + 1] == '*') && (u[j + 1][i - 1] ==
'*')) {
                    s[3][j][i] = '#';
                }
            }
        }
    }
        break;
    } case 4: {
    for (j = 1; j < S1ROW - 1; j++) {
        for (i = 1; i < S1COL; i++) {
            if (u[j][i] == '*') {
```

```c
                if ((u[j - 1][i] == '*') && (u[j + 1][i - 1] == '*'))
{
                    s[4][j][i] = '#';
                }
            }
        }
    }
        break;
    } case 5: {
    for (j = 1; j < S1ROW - 1; j++)    {
        for (i = 0; i < S1COL - 1; i++)    {
            if (u[j][i] == '*')    {
            if ((u[j - 1][i + 1] == '*') && (u[j + 1][i] == '*'))
{
                    s[5][j][i] = '#';
                }
            }
        }
    }
        break;
    } case 6: {
    for (j = 1; j < S1ROW - 1; j++)    {
        for (i = 0; i < S1COL; i++)    {
            if (u[j][i] == '*')    {
            if ((u[j - 1][i] == '*') && (u[j + 1][i] == '*'))
{
                    s[6][j][i] = '#';
                }
            }
        }
    }
        break;
    } case 7: {
    for (j = 1; j < S1ROW - 1; j++)    {
        for (i = 1; i < S1COL; i++)    {
            if (u[j][i] == '*')    {
            if ((u[j - 1][i - 1] == '*') && (u[j + 1][i] == '*'))
{
                    s[7][j][i] = '#';
                }
            }
        }
    }
        break;
    } case 8: {
    for (j = 1; j < S1ROW - 1; j++)    {
```

```
     for (i = 0; i < S1COL - 1; i++)   {
         if (u[j][i] == '*')    {
         if ((u[j - 1][i] == '*') && (u[j + 1][i + 1] == '*'))
{
             s[8][j][i] = '#';
             }
         }
      }
   }
      break;
   } case 9:  {
   for (j = 1; j < S1ROW - 1; j++)    {
      for (i = 1; i < S1COL - 1; i++)    {
          if (u[j][i] == '*')    {
          if ((u[j - 1][i - 1] == '*') && (u[j + 1][i + 1] ==
'*'))    {
             s[9][j][i] = '#';
             }
         }
      }
   }
      break;
   } case 10: {
   for (j = 0; j < S1ROW - 1; j++)    {
      for (i = 1; i < S1COL - 1; i++)    {
          if (u[j][i] == '*')    {
          if ((u[j][i - 1] == '*') && (u[j + 1][i + 1] == '*'))
{
             s[10][j][i] = '#';
             }
         }
      }
   }
      break;
   } case 11: {
   for (j = 1; j < S1ROW; j++)    {
      for (i = 1; i < S1COL - 1; i++)    {
          if (u[j][i] == '*')    {
          if ((u[j - 1][i - 1] == '*') && (u[j][i + 1] == '*'))
{
             s[11][j][i] = '#';
             }
         }
      }
   }
   break;
   }
```

```
    }
    for (j = 0; j < S1ROW; j++) {
        for (i = 0; i < S1COL; i++) {
            for (k = 0; k < S1PAG; k += 3)      {
                if (s[k][j][i] == '*') {
                if (s[k+1][j][i] == ' ')      s[k-1][j][i] = '*';
                cd = (k + 11) % 12;
                    if (s[cd][j][i] == ' ')     s[cd][j][i] = '*';
                }
            }
        }
    }
} void wafs1file(char cname[20], char fn[1], int cl, int rw, int pg,
               char s[12][19][19])
{
  int     i, j, k;
  FILE    *fw;

fw = fopen(cname, fn);
  for (k = 0; k < pg; k++)    {
     for (j = 0; j < rw; j++)    {
         for (i = 0; i < cl; i++)    {
             fprintf(fw, "%c", s[k][j][i]);
         }
         fprintf(fw, "\n");
     }
     fprintf(fw, "\n\n");
  }
  fprintf(fw, "\n\n\n");
  fclose(fw);
} void clears1(int cl, int rw, int pg, char s[12][19][19])
{
  int     i, j, k;

for (k = 0; k < pg; k++)    {
      for (j = 0; j < rw; j++)    {
          for (i = 0; i < cl; i++)     {
              s[k][j][i] = ' ';
          }
      }
   }
} void rfu0file(char cname[20], int cl, int rw, char a[19][19])
{
```

```
    int         i, j;
    char        ch;
    FILE        *fr;

fr = fopen(cname, "r");
    for (j = 0; j < rw; j++)   {
        for (i = 0; i < cl; i++)   {
            fscanf(fr, "%c", &a[j][i]);
        }
        fscanf(fr, "%c", &ch);
    }
    fscanf(fr, "%c", &ch);
    fscanf(fr, "%c", &ch);
    fclose(fr);
}
```

```c
/*   S1C1.C
                              Youguang Xu
                              Nov. 23, 1993            */ include    <dos.h>
include    <graphics.h>
#include    <conio.h>
#include    <stdio.h>
#include    <stdlib.h>
#include    <math.h>
#include    "s1c1.h"

void main(void)
{
   int       g_driver, g_mode, g_error, ox, oy;
   int       i, j, k, m, cx, cy, fx, fy, cr, kr, kc, x, y, mx,
my, tx, ty;
   int       lx[8][2], ly[8][2];
   char      s1t[19][19], c1t[21][21];

clrscr();
   clearc1(C1COL, C1ROW, C1PAG, c1);
   rfs1file(s1out, S1COL, S1ROW, S1PAG, s1);
   mks1c1(S1COL, S1ROW, S1PAG, s1, c1);
   wafc1file(c1out, "w", C1COL, C1ROW, C1PAG, c1);
   closegraph();
   exit(0);
} void mks1c1(int scl, int srw, int spg, char s[12][19][19], char
c[8][21][21])
{
   int       i, j, k, ck;
   char      c1t[21][21];

for (k = 0; k < spg; k++)   {
      for (j = 0; j < srw; j++)   {
      for (i = 0; i < scl; i++)   {
         switch(k)   {
         case 0:
         case 3:
         case 6:
         case 9:
         {
                  ck = k*2/3;
                  c[ck][j + 1][i + 1] = s[k][j][i];
                  break;
         }
         case 1:
         case 4:
         case 7:
```

```
            case 10:
            {
                ck = k - k/3;
                c[ck][j + 1][i + 1] = ' ';
                        if ((s[k][j][i] == '*') || (s[k+1][j][i]
== '*'))
                    c[ck][j + 1][i + 1] = '*';
                if ((s[k][j][i] == '#') || (s[k+1][j][i] == '#'))
                    c[ck][j + 1][i + 1] = '#';
                break;
            }
            default:  break;
            }
        }
    }
} for (k = 0; k < C1PAG; k++)   {
    for (j = 0; j < C1ROW; j++)   {
     for (i = 0; i < C1COL; i++)   {
        clt[j][i] = ' ';
     }
    } for (j = 1; j < C1ROW - 1; j++)   {
     for (i = 1; i < C1COL - 1; i++)   {
        if (c[k][j][i] == '*')   {
            clt[j - 1][i - 1] = '*';
            clt[j - 1][i    ] = '*';
            clt[j - 1][i + 1] = '*';
            clt[j    ][i - 1] = '*';
            clt[j    ][i    ] = '*';
            clt[j    ][i + 1] = '*';
            clt[j + 1][i - 1] = '*';
            clt[j + 1][i    ] = '*';
            clt[j + 1][i + 1] = '*';
        }
     }
    } for (j = 1; j < C1ROW - 1; j++)   {
     for (i = 1; i < C1COL - 1; i++)   {
            if (c[k][j][i] == '#')   {
            clt[j - 1][i - 1] = '#';
            clt[j - 1][i    ] = '#';
            clt[j - 1][i - 1] = '#';
            clt[j    ][i - 1] = '#';
            clt[j    ][i    ] = '#';
            clt[j    ][i + 1] = '#';
            clt[j + 1][i - 1] = '#';
            clt[j + 1][i    ] = '#';
            clt[j + 1][i + 1] = '#';
        }
     }
    }
```

We claim:

1. A neural network system for pattern recognition, comprising:

storage means for storing a plurality of reference vectors, each of which is associated with a known pattern;

input means for inputting a target pattern having n dimensions which is to be identified;

processing means for receiving said target pattern from said input means and processing said target pattern so as to generate a characteristic vector for said target pattern;

comparator means for comparing said characteristic vector with one or more of said reference vectors until a match has been found or until all of said reference vectors have been compared to said characteristic vector;

output means for outputting the result of a match between said characteristic vector and one or more of said reference vectors, or outputting the result that no match has been found;

digitizing means for converting the target pattern to a bitmap of cells; and masking means for generating an additional dimension to the n-dimensional target pattern so as to create an n+1 dimensional hyperdimensioned target pattern by applying successive masking windows to said bitmap of the target pattern, assigning weights to each of the cells of the bitmap, said weights dependent on the degree of match between the cell being weighted and the successive masking windows.

2. A system as in claim 1 wherein the masking means generates a hyperdimensioned characteristic vector from the characteristic vector and wherein the comparator means compares said hyperdimensioned characteristic vector with hyperdimensioned reference vectors.

3. A system as in claim 1 wherein each reference vector is an array comprising at least 2 sections, one section comprising a pattern name and one section comprising memory units representing end directions of a character's strokes.

4. A system as in claim 3 wherein one section of the reference vector array comprises memory units storing local peak altitudes of the character represented by the reference vector.

5. A system as in claim 4 wherein one section of the reference vector array comprises memory units storing the altitudes of neighboring cells of the cell with the highest peak.

6. A system as in claim 5 wherein one section of the reference vector array comprises memory units storing features specific to particular characters.

7. A system as in claim 1 wherein n=2.

8. A system for pattern recognition, implemented on a general purpose computer having a central processing unit (CPU), feature library input means, feature library storage means, comparator means, masking means, target pattern input means and output means, comprising:

target pattern input means suitable for acquiring an n-dimensional input target pattern in a form suitable for processing by said CPU;

masking means which receive said n-dimensional input target pattern and generate an n+1-dimensional hyperdimensioned vector to said comparator means;

feature library input means for acquiring a library of feature vectors of n+1 dimensions associated with n dimensional reference characters; feature library storage means for storing said library of feature vectors;

comparator means for receiving said hyperdimensioned input target pattern vector, successively comparing said hyperdimensioned vector with feature vectors from said feature library storage means, and outputting the result of said comparing to output means.

9. A system as in claim 8 wherein:

said target pattern input means comprises a mouse;

said masking means and comparator means comprise said computer's CPU;

said feature library storage means comprises a disk;

said feature library input means comprises a disk drive; and said output means comprises a video display screen.

10. A process for pattern recognition comprising the steps of:

providing a digitized image of an n-dimensional input target pattern to be recognized;

providing a library of hyperdimensioned reference vectors having n+1 dimensions, each corresponding to a known character;

hyperdimensioning said digitized image of said n-dimensional input target pattern so as to create an n+1 dimensional vector;

comparing said n+1 dimensional vector to each of said reference vectors until a match occurs, or until all of said reference vectors have been compared without a match occurring;

identifying the input target pattern as the character corresponding to the matching reference vector if a match occurs or declaring the input target pattern as not identifiable if no match occurs.

11. A system as in claim 8 wherein said masking means generates said hyperdimensioned vector by applying successive masks to said input target pattern so as to generate an (n+1)st dimension.

12. A system as in claim 11 wherein said (n+1)st dimension corresponds to a degree of fit between the input target pattern and the masks.

13. A system as in claim 12 wherein said successive masks comprise a 2×2 cell mask and a 3×3 cell mask.

* * * * *